United States Patent
Mizoguchi et al.

(10) Patent No.: US 9,759,908 B2
(45) Date of Patent: Sep. 12, 2017

(54) OPTICAL SCANNER, IMAGE DISPLAY DEVICE, HEAD MOUNT DISPLAY, AND HEADS-UP DISPLAY

(71) Applicant: Seiko Epson Corporation, Tokyo (JP)

(72) Inventors: Yasushi Mizoguchi, Suwa (JP); Makiko Hino, Matsumoto (JP); Hisako Kojima, Chino (JP)

(73) Assignee: Seiko Epson Corporation (JP)

( * ) Notice: Subject to any disclaimer, the term of this patent is extended or adjusted under 35 U.S.C. 154(b) by 2 days.

(21) Appl. No.: 14/524,434

(22) Filed: Oct. 27, 2014

(65) Prior Publication Data
US 2015/0116804 A1    Apr. 30, 2015

(30) Foreign Application Priority Data
Oct. 29, 2013   (JP) .................................. 2013-223982

(51) Int. Cl.
    G02B 26/08    (2006.01)
    G02B 26/10    (2006.01)
    G02B 27/01    (2006.01)

(52) U.S. Cl.
    CPC ......... *G02B 26/085* (2013.01); *G02B 26/101* (2013.01); *G02B 26/105* (2013.01);
    (Continued)

(58) Field of Classification Search
    CPC  G02B 26/0841; G02B 26/105; G02B 26/085; G02B 26/0858; G02B 26/0833;
    (Continued)

(56) References Cited

U.S. PATENT DOCUMENTS

| | | | |
|---|---|---|---|
| 5,912,608 A | 6/1999 | Asada | |
| 6,285,485 B1* | 9/2001 | Ferreira | H02K 33/00 310/36 |

(Continued)

FOREIGN PATENT DOCUMENTS

| | | |
|---|---|---|
| EP | 1275997 A2 | 7/2002 |
| EP | 1881358 A1 | 1/2008 |

(Continued)

OTHER PUBLICATIONS

Extended Search Report for European Patent Application No. 14190449.0, dated Mar. 6, 2015 (6 pages).

(Continued)

*Primary Examiner* — Jennifer L. Doak
(74) *Attorney, Agent, or Firm* — Harness, Dickey & Pierce, P.L.C.

(57) ABSTRACT

An optical scanner includes: a movable plate which includes a light reflection unit which reflects light; a first torsion bar spring which oscillatably supports the movable plate around a first axis; a displacement member which is connected to the first torsion bar spring; a second torsion bar spring which oscillatably supports the displacement member around a second axis intersecting with the first axis; a coil provided on the displacement member; and a magnet which is provided spaced apart from the displacement member, and generates a magnetic field to be inclined with respect to the first axis and the second axis and to act on the coil, wherein the displacement member includes a frame surrounding the movable plate, and a damper which has a smaller thickness than that of the frame and extends in a direction intersecting with a direction in which the second torsion bar spring extends from the frame.

13 Claims, 14 Drawing Sheets

(52) U.S. Cl.
CPC ..... *G02B 27/0149* (2013.01); *G02B 27/0176* (2013.01); *G02B 2027/0154* (2013.01)

(58) Field of Classification Search
CPC ... G02B 26/101; B81B 3/0083; B81B 3/0086; B81B 2203/04
USPC ........ 359/198.1–199.4, 200.6–200.8, 202.1, 359/221.2, 223.1–225.1, 226.2, 904, 359/290–295, 838, 846, 871, 872; 250/204, 559.06, 559.29, 230, 234; 347/255–260; 353/39, 98–99; 385/15–18, 22; 398/12, 19, 45
See application file for complete search history.

(56) References Cited

U.S. PATENT DOCUMENTS

| | | | |
|---|---|---|---|
| 6,388,789 B1* | 5/2002 | Bernstein | B81B 3/0021 359/198.1 |
| 7,170,665 B2* | 1/2007 | Kaneko | G02B 7/02 310/22 |
| 7,416,126 B2 | 8/2008 | Wittenberg et al. | |
| 7,570,406 B2 | 8/2009 | Mizoguchi et al. | |
| 7,688,490 B2 | 3/2010 | Mizoguchi | |
| 7,697,181 B2 | 4/2010 | Mizoguchi | |
| 7,724,411 B2 | 5/2010 | Ko et al. | |
| 7,777,927 B2 | 8/2010 | Mizoguchi et al. | |
| 8,089,673 B2 | 1/2012 | Mizoguchi et al. | |
| 8,254,006 B2 | 8/2012 | Miyagawa et al. | |
| 2004/0070806 A1 | 4/2004 | Ryu et al. | |
| 2006/0139719 A1* | 6/2006 | Nishio | G02B 26/085 359/212.1 |
| 2007/0268099 A1 | 11/2007 | Jeong et al. | |
| 2008/0226312 A1 | 9/2008 | Mizoguchi et al. | |
| 2013/0278985 A1 | 10/2013 | Hino et al. | |
| 2013/0301099 A1 | 11/2013 | Mizoguchi et al. | |
| 2013/0301100 A1 | 11/2013 | Mizoguchi et al. | |
| 2014/0071510 A1 | 3/2014 | Mizuno et al. | |

FOREIGN PATENT DOCUMENTS

| | | |
|---|---|---|
| JP | 08-322227 A | 3/1996 |
| JP | 2004-266957 A | 9/2004 |
| JP | 2005-250077 A | 9/2005 |
| JP | 2007-312592 A | 11/2007 |
| JP | 2008-203497 A | 9/2008 |
| JP | 2008-216597 A | 9/2008 |
| JP | 2008-547056 A | 12/2008 |
| JP | 2009-020367 A | 1/2009 |
| JP | 4232834 B2 | 3/2009 |
| JP | 4232835 B2 | 3/2009 |
| JP | 4329831 B2 | 9/2009 |
| JP | 2010-019933 A | 1/2010 |
| JP | 2010-019934 A | 1/2010 |
| JP | 4984987 B2 | 7/2012 |
| JP | 2012-150350 A | 8/2012 |
| JP | 5045611 B2 | 10/2012 |
| JP | 5085476 B2 | 11/2012 |
| JP | 2013-101198 A | 5/2013 |
| JP | 2013-101199 A | 5/2013 |
| JP | 2013-104880 A | 5/2013 |
| JP | 5206610 B2 | 6/2013 |
| JP | 2013-228424 A | 11/2013 |
| JP | 2013-235200 A | 11/2013 |
| JP | 2013-235213 A | 11/2013 |
| JP | 2013-242455 A | 12/2013 |
| JP | 2014-021424 A | 2/2014 |
| JP | 2014-041234 A | 3/2014 |
| JP | 2014-048615 A | 3/2014 |
| JP | 2014-056132 A | 3/2014 |
| JP | 2014-056211 A | 3/2014 |

OTHER PUBLICATIONS

Extended European Search Report for Application No. EP 14 19 0450 dated Mar. 6, 2015 (6 pages).

* cited by examiner

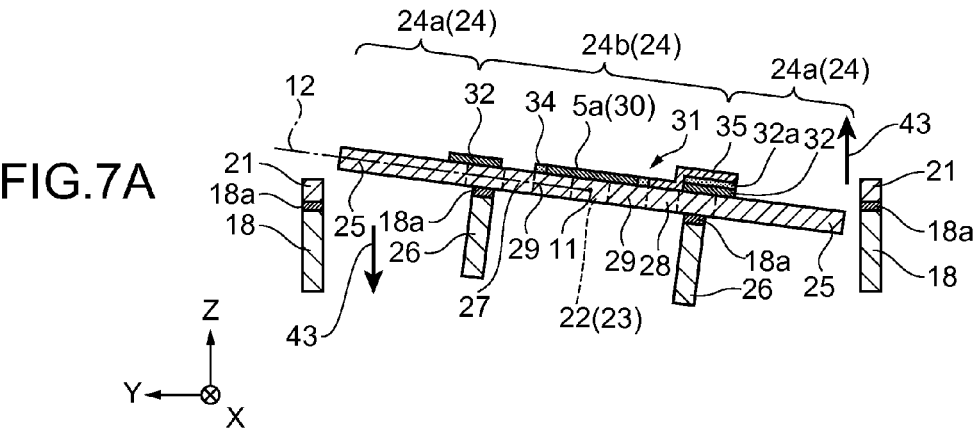
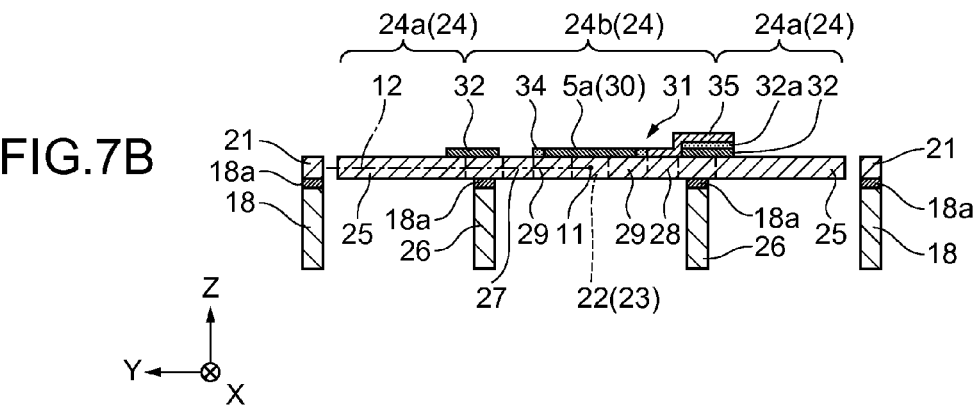
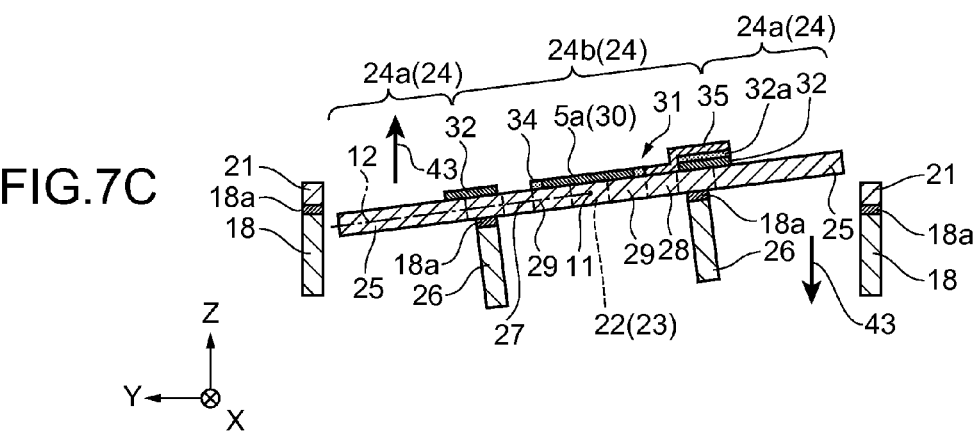

OPTICAL SCANNER, IMAGE DISPLAY DEVICE, HEAD MOUNT DISPLAY, AND HEADS-UP DISPLAY

BACKGROUND

1. Technical Field

The present invention relates to an optical scanner, an image display device, a head mount display, and a heads-up display.

2. Related Art

An optical scanner for performing drawing by optical scanning has been used in a laser printer or an image display device. JP-A-2009-75587 discloses an optical scanner including torsion bar springs in two directions which are orthogonal to each other. According to this, in the optical scanner, a movable plate is oscillatably supported by a pair of first torsion bar springs. The other end of the first torsion bar spring is connected to a frame-shaped displacement portion. In addition, the displacement portion is oscillatably supported by a second torsion bar spring. The other end of the second torsion bar spring is connected by a frame-shaped support portion. A direction in which the first torsion bar spring extends is set as a first direction, and a direction in which the second torsion bar spring extends is set as a second direction. The first direction and the second direction are orthogonal to each other. Accordingly, the movable plate can be oscillated by using the two directions orthogonal to each other as rotation axes.

A permanent magnet is provided to surround the movable plate and the displacement portion in a plan view seen from a thickness direction of the movable plate. The permanent magnet is installed to be inclined by 45° with respect to the first direction. Coils are installed on the movable plate and the displacement portion, respectively. A horizontal scanning driving signal at a frequency of approximately 25 KHz having a sine waveform is input to the coil installed on the movable plate. A vertical scanning driving signal at a frequency of approximately 60 Hz having a saw-tooth waveform is input to the coil installed on the displacement portion. Accordingly, the movable plate is operated with respect to the displacement portion to correspond to the horizontal scanning driving signal. The displacement portion is operated with respect to the support portion to correspond to the vertical scanning driving signal.

JP-A-2005-250077 discloses an optical scanner including torsion bar springs in one direction. By doing so, in the optical scanner, a first movable plate is oscillatably supported by a pair of the torsion bar springs. One torsion bar spring portion is fixed to a support body. The other torsion bar spring portion is connected to a second movable plate. A coil is installed on the second movable plate and a magnetic field acts on the coil, and accordingly the second movable plate is oscillated. The first movable plate oscillates by oscillation of the second movable plate. The second movable plate has a damper structure. A Q value of the optical scanner is decreased by the damper structure. This damper structure is not a mechanism for suppressing mutual effects of the two movable plates.

A miniaturized optical scanner is desirable in order to use the optical scanner in a portable device. When miniaturizing the optical scanner disclosed in JP-A-2009-75587, it is also necessary to miniaturize the displacement portion. The coil installed on the displacement portion receives an electromagnetic wave output by the coil installed on the movable plate. Accordingly, the displacement portion to be only operated corresponding to the vertical scanning driving signal is operated with an influence of the horizontal scanning driving signal. In addition, the displacement portion is easily oscillated with an influence of the oscillation of the movable plate. When miniaturizing the displacement portion, an inertia moment of the displacement portion also decreases, and accordingly the displacement portion is easily affected by the horizontal scanning driving signal. As a result, the movable plate is operated with an oscillation component which is unnecessary for the vertical scanning. Therefore, an optical scanner having an improved vibration performance so that the horizontal scanning hardly affects the vertical scanning even with the miniaturized optical scanner, has been desired.

SUMMARY

An advantage of some aspects of the invention is to solve at least a part of the problems described above, and the invention can be implemented as the following forms or application examples.

Application Example 1

This application example is directed to an optical scanner including: a movable plate which includes a light reflection unit which reflects light; a first torsion bar spring portion which oscillatably supports the movable plate around a first axis; a displacement portion which is connected to the first torsion bar spring portion; a second torsion bar spring portion which oscillatably supports the displacement portion around a second axis intersecting with the first axis; a coil provided on the displacement portion; and a magnet which is provided to be separated from the displacement portion, and generates a magnetic field to be inclined with respect to the first axis and the second axis and to act on the coil, in which the displacement portion includes a frame portion surrounding the movable plate, and a damper portion which has a smaller thickness than that of the frame portion and extends in a direction intersecting with a direction in which the second torsion bar spring portion extends from the frame portion.

According to this application example, one end of the first torsion bar spring portion supports the movable plate and the other end of the first torsion bar spring portion is connected to the displacement portion. The displacement portion is supported by the second torsion bar spring portion. The direction in which the first torsion bar spring portion extends and the direction in which the second torsion bar spring portion extends intersect with each other. The movable plate oscillates around the first axis which is an axis of the first torsion bar spring portion, and the displacement portion oscillates around the second axis which is an axis of the second torsion bar spring portion. Accordingly, the light reflection unit oscillates around axes in two directions intersecting with each other.

The coil is provided on the displacement portion. The magnet which generates the magnetic field acting on the coil to drive the displacement portion is installed. By driving the displacement portion with the electrical connection of the coil, the optical scanner can cause the light reflection unit to oscillate around axes in two directions intersecting with each other. The displacement portion includes the frame portion and the damper portion. The frame portion maintains a relative position of the first torsion bar spring portion and the second torsion bar spring portion. The damper portion extends from the frame portion in a direction intersecting with the direction in which the second torsion bar spring portion extends. When the displacement portion oscillates around the second axis, the damper portion functions as a damper by generating an air current around the damper portion. Accordingly, it is possible to set the displacement portion to resist reacting with respect to driving with a high frequency. Thus, when the light reflection unit oscillates around the axis of the second torsion bar spring portion, it is possible to set the light reflection unit to resist reacting with respect to the high frequency. As a result, it is possible to improve the vibration performance of the light reflection unit.

Application Example 2

This application example is directed to the optical scanner according to the application example described above, wherein the coil includes a first conductive wire portion which extends in a direction in which the second torsion bar spring portion extends, and the first conductive wire portion is positioned at a position separated from the frame portion.

According to this application example, the coil includes the first conductive wire portion which extends in a direction in which the second torsion bar spring portion extends. When the displacement portion oscillates by using the second torsion bar spring portion as an axis, stress fluctuates at a portion where the frame portion and the damper portion are connected to each other. Since the first conductive wire portion and the frame portion are separated from each other, the first conductive wire portion is separated from a position where the stress fluctuates. Accordingly, it is possible to reduce stress fluctuation, compared to when the first conductive wire portion is installed at a position where the frame portion and the damper portion are connected to each other. As a result, it is possible to suppress disconnection of the first conductive wire portion due to fatigue of metals.

Application Example 3

This application example is directed to the optical scanner according to the application example described above, wherein a thickness of the damper portion at a position separated from the second torsion bar spring portion is greater than a thickness thereof at a position closer to the second torsion bar spring portion.

According to this application example, the damper portion becomes thicker at the position separated from the second torsion bar spring portion, than the position close to the second torsion bar spring portion. Accordingly, it is possible to increase the inertia moment of the displacement portion, compared to when the thickness of the damper portion at a position separated from the second torsion bar spring portion is thin. Accordingly, it is possible to set the displacement portion to resist reacting with respect to the high frequency driving. Thus, when the light reflection unit oscillates around the second axis, it is possible to set the light reflection unit to resist reacting with respect to the high frequency driving. As a result, it is possible to improve the vibration performance of the light reflection unit.

Application Example 4

This application example is directed to the optical scanner according to the application example described above, wherein a length of the displacement portion in a direction in which the first torsion bar spring portion extends is greater than a length of the displacement portion in a direction in which the second torsion bar spring portion extends.

According to this application example, the lengths of the displacement portion in the two directions intersecting with each other are different from each other. A length of the displacement portion in a direction in which the first torsion bar spring portion extends is set as a first length. A length of the displacement portion in a direction in which the second torsion bar spring portion extends is set as a second length. The first length is set to be greater than the second length. Accordingly, when the displacement portion oscillates around an axis of the second torsion bar spring portion, a movement amount of the damper portion is great, compared to when the displacement portion oscillates around an axis of the first torsion bar spring portion. Accordingly, when the displacement portion oscillates around an axis of the second torsion bar spring portion, resistance increases, compared to when the displacement portion oscillates around an axis of the first torsion bar spring portion. As a result, it is possible to set the displacement portion to resist reacting around an axis of the second torsion bar spring portion with respect to the high frequency driving.

Application Example 5

This application example is directed to the optical scanner according to the application example described above, wherein the light reflection unit includes a reflection plate and a support which supports the reflection plate, and the reflection plate and the displacement portion are installed at an interval in a thickness direction of the reflection plate, and a part of the reflection plate in a plan view seen from a thickness direction of the reflection plate is overlapped with the displacement portion.

According to this application example, the reflection plate and the displacement portion are installed at an interval. In a plan view seen from a thickness direction of the reflection plate, the reflection plate is overlapped with the displacement portion. In this configuration, a length of the displacement portion can be set to be small, compared to when the reflection plate and the displacement portion are positioned on the same plane. Accordingly, it is possible to provide the miniaturized optical scanner.

Application Example 6

This application example is directed to the optical scanner according to the application example described above, wherein a portion of the damper portion at a position with a great thickness is protruded to the opposite side to a side where the frame portion is protruded in the thickness direction with respect to the damper portion.

According to this application example, the side where the frame portion is protruded in the thickness direction with respect to the damper portion and the side where a portion of the damper portion at the position with a great thickness is protruded are opposite to each other. Accordingly, it is possible to obtain a balanced inertia moment of the displacement portion with respect to an axis of the second torsion bar spring portion, and unnecessary vibration for the torsion operation around the axis of the second torsion bar spring portion is unlikely to be superposed, compared to a structure in which the side where the frame portion is protruded in the thickness direction with respect to the damper portion and the side where the position with a great thickness of the damper portion is protruded are the same sides. That is, since a gravity center of the displacement portion may become closer to the axis of the second torsion bar spring portion, it is possible to reduce combined stress due to the torsion stress and bending stress applied to the second torsion bar spring portion.

Application Example 7

This application example is directed to the optical scanner according to the application example described above, wherein the coil includes a second conductive wire portion and a third conductive wire portion, and the third conductive wire portion has a smaller thickness than that of the second conductive wire portion and a greater width than that of the second conductive wire portion in a plan view seen from the thickness direction of the displacement portion, and the third conductive wire portion is positioned at a location where the frame portion and the damper portion are connected to each other.

According to this application example, the coil includes the second conductive wire portion and the third conductive wire portion. The third conductive wire portion has a smaller thickness than that of the second conductive wire portion. The third conductive wire portion has a greater width than that of the second conductive wire portion in a plan view seen from the thickness direction of the displacement portion. Accordingly, a cross-sectional area of the second conductive wire portion is the same cross-sectional area as that of the third conductive wire portion. The displacement portion oscillates by using the second torsion bar spring portion as an axis. At that time, the frame portion has small deformation and the damper portion is easily bent due to a smaller thickness than that of the frame portion. Since great stress is applied to the displacement portion at a position where the frame portion and the damper portion are connected to each other, the surface of the damper portion is expanded and contracted. In the same manner as described above, the coil positioned at a position where the frame portion and the damper portion are connected to each other, is also expanded and contracted with the oscillation. The third conductive wire portion is installed at this position. Since the third conductive wire portion has a smaller thickness than that of the second conductive wire portion, internal stress of the third conductive wire portion is suppressed. Therefore, it is possible to suppress fatigue failure of the coil.

Application Example 8

This application example is directed to an image display device including: a light source which emits light; and an optical scanner, in which the optical scanner includes a movable plate which includes a light reflection unit which reflects light; a first torsion bar spring portion which oscillatably supports the movable plate around a first axis; a displacement portion which is connected to the first torsion bar spring portion; a second torsion bar spring portion which oscillatably supports the displacement portion around a second axis intersecting with the first axis; a coil provided on the displacement portion; and a magnet which is provided to be separated from the displacement portion, and generates a magnetic field to be inclined with respect to the first axis and the second axis and to act on the coil, and the displacement portion includes a frame portion surrounding the movable plate, and a damper portion which has a smaller thickness than that of the frame portion and extends in a direction intersecting with a direction in which the second torsion bar spring portion extends from the frame portion.

According to this application example, the light reflection unit reflects the light emitted from the light source. Since the light reflection unit oscillates around the axes of the two directions intersecting with each other, the image display device can display an image by changing a movement direction of the light. When the displacement portion oscillates around the second axis, the damper portion functions as a damper by flowing the air current around the damper portion. Accordingly, it is possible to set the displacement portion to resist reacting with respect to the high frequency driving. Thus, when the light reflection unit oscillates around the second axis, it is possible to set the light reflection unit to resist reacting with respect to the high frequency driving. As a result, the image display device can improve the vibration performance of the light reflection unit.

Application Example 9

This application example is directed to a head mount display including: a frame to be mounted on a head of a viewer; a light source which emits light; and an optical scanner provided on the frame, in which the optical scanner includes a movable plate which includes a light reflection unit which reflects light; a first torsion bar spring portion which oscillatably supports the movable plate around a first axis; a displacement portion which is connected to the first torsion bar spring portion; a second torsion bar spring portion which oscillatably supports the displacement portion around a second axis intersecting with the first axis; a coil provided on the displacement portion; and a magnet which is provided to be separated from the displacement portion, and generates a magnetic field to be inclined with respect to the first axis and the second axis and to act on the coil, and the displacement portion includes a frame portion surrounding the movable plate, and a damper portion which has a smaller thickness than that of the frame portion and extends in a direction intersecting with a direction in which the second torsion bar spring portion extends from the frame portion.

According to this application example, a viewer can mount the head mount display on the viewer's head by using the frame. In the head mount display, the light source emits light to the optical scanner. In the optical scanner, the light reflection unit reflects the light emitted from the light source. Since the light reflection unit oscillates around the axes of the two directions intersecting with each other, the optical scanner can display an image by changing the movement direction of the light. When the displacement portion oscillates around the second axis, the damper portion functions as a damper by flowing the air current around the damper portion. Accordingly, it is possible to set the displacement portion to resist reacting with respect to the high frequency driving. Thus, when the light reflection unit oscillates around the second axis, it is possible to set the light reflection unit to resist reacting with respect to the high frequency driving. As a result, the head mount display can be set as a device including an optical scanner having excellent vibration performance.

Application Example 10

This application example is directed to a heads-up display which emits light on a windshield of a vehicle, including: a light source which emits light; and an optical scanner, in which the optical scanner includes a movable plate which includes a light reflection unit which reflects light; a first torsion bar spring portion which oscillatably supports the movable plate around a first axis; a displacement portion which is connected to the first torsion bar spring portion; a second torsion bar spring portion which oscillatably supports the displacement portion around a second axis intersecting with the first axis; a coil provided on the displacement portion; and a magnet which is provided to be separated from the displacement portion, and generates a magnetic field to be inclined with respect to the first axis and the second axis and to act on the coil, and the displacement portion includes a frame portion surrounding the movable plate, and a damper portion which has a smaller thickness than that of the frame portion and extends in a direction intersecting with a direction in which the second torsion bar spring portion extends from the frame portion.

According to this application example, in the heads-up display, the optical scanner emits the light emitted by the light source on a windshield of a vehicle. In the optical scanner, the light reflection unit reflects the light emitted from the light source. Since the light reflection unit oscillates around the axes of the two directions intersecting with each other, the heads-up display can display an image by changing the movement direction of the light. When the displacement portion oscillates around the second axis, the damper portion functions as a damper by flowing the air current around the damper portion. Accordingly, it is possible to set the displacement portion to resist reacting with respect to the high frequency driving. Thus, when the light reflection unit oscillates around the second axis, it is possible to set the light reflection unit to resist reacting with respect to the high frequency driving. As a result, the heads-up display can be set as a device including an optical scanner with excellent vibration performance.

BRIEF DESCRIPTION OF THE DRAWINGS

Embodiments of the invention will be described with reference to the accompanying drawings, wherein like numbers reference like elements.

FIGS. 7A to 7C are schematic views illustrating operations of a displacement portion.

FIGS. 10A and 10B illustrate a second embodiment, in which FIG. 10A is a schematic plan view showing a structure of an optical scanner and FIG. 10B is a schematic cross-sectional side view showing a structure of an optical scanner.

FIGS. 11A and 11B illustrate a third embodiment, in which FIG. 11A is a schematic plan view showing a structure of an optical scanner and FIG. 11B is a schematic cross-sectional side view showing a structure of an optical scanner.

FIGS. 12A and 12B illustrate a fourth embodiment, in which FIG. 12A is a schematic plan view showing a structure of an optical scanner and FIG. 12B is a schematic cross-sectional side view showing a structure of an optical scanner.

FIGS. 13A to 13C illustrate a fifth embodiment, in which FIG. 13A is a schematic plan view showing main portions of a structure of a displacement portion and FIGS. 13B and 13C are schematic cross-sectional side views showing main portions of a structure of a winding wire of a coil.

DESCRIPTION OF EXEMPLARY EMBODIMENTS

In the embodiments, characteristic examples of an image display device, an optical scanner, a heads-up display, a head mount display, and a manufacturing method of the optical scanner will be described with reference to accompanying drawings. Since each member in each drawing is shown with a size to be recognized in each drawing, the drawings are shown with different reduction scales for each member.

First Embodiment

Image Display Device

Figure 1:
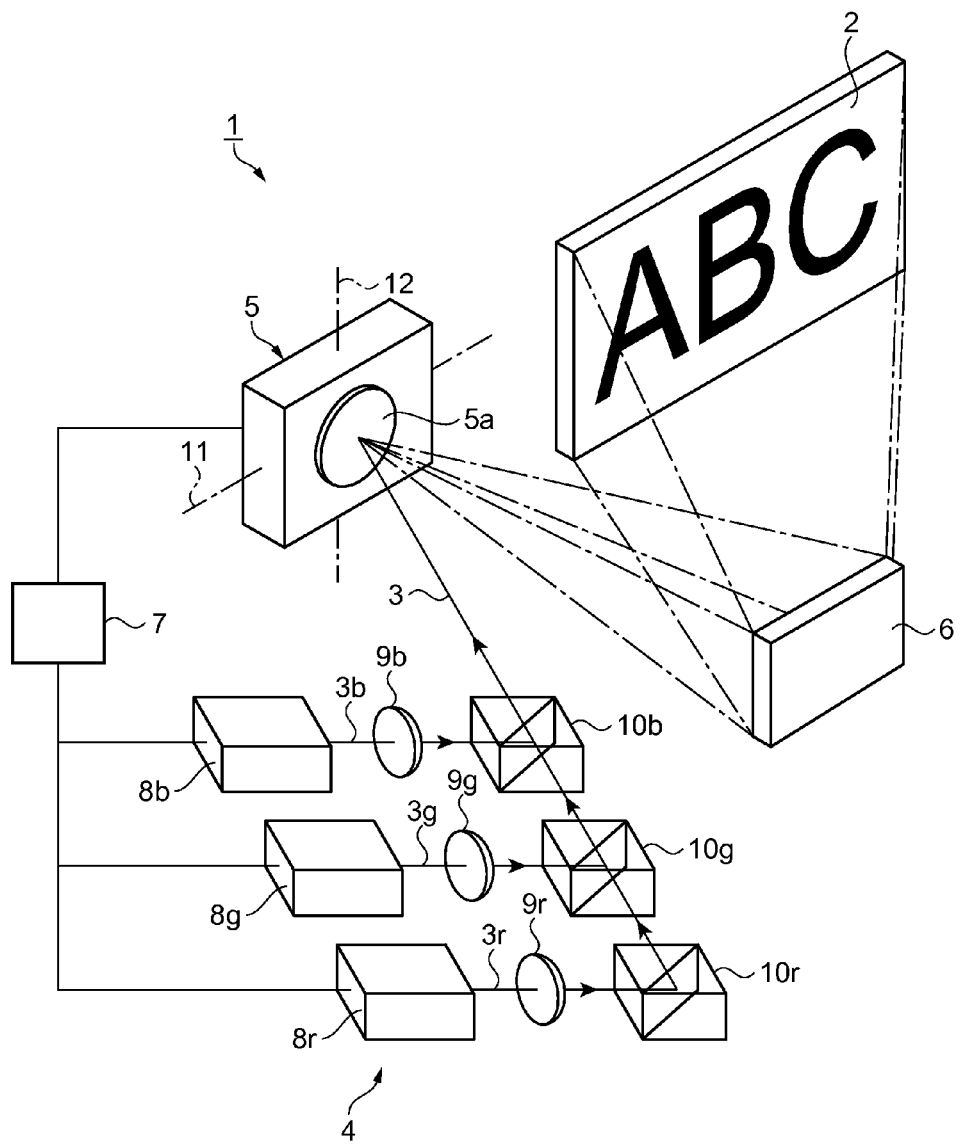
FIG. 1 is a schematic perspective view showing a configuration of an image display device according to a first embodiment.

A configuration of an image display device will be described with reference to FIG. 1. FIG. 1 is a schematic perspective view showing a configuration of an image display device. An image display device 1 shown in FIG. 1 is a device which displays an image by two-dimensionally scanning drawing laser light 3 as light on a screen 2 such as a screen or a wall surface. The image display device 1 includes a drawing light source unit 4 which emits the drawing laser light 3, an optical scanner 5 which scans the drawing laser light 3, a mirror 6 which reflects the drawing laser light 3 scanned by the optical scanner 5, and a control unit 7 which controls operations of the drawing light source unit 4 and the optical scanner 5. The mirror 6 may be provided if desired, and may be omitted.

The drawing light source unit 4 includes laser light sources 8r, 8g, and 8b as red, green, and blue light sources, collimator lenses 9r, 9g, 9b and dichroic mirrors 10r, 10g, and 10b which are provided to correspond to the laser light sources 8r, 8g, and 8b.

Each of the laser light sources 8r, 8g, and 8b includes a driving circuit (not shown) which drives the light source. The laser light source 8r emits a red laser light beam 3r, the laser light source 8g emits a green laser light beam 3g, and the laser light source 8b emits a blue laser light beam 3b. Each of the laser light beams 3r, 3g, and 3b is emitted corresponding to a driving signal transmitted from the control unit 7, and is set to a parallel light beam or an approximately parallel light beam by the collimator lenses 9r, 9g, and 9b. As the laser light sources 8r, 8g, and 8b, a semiconductor laser such as an edge emitting semiconductor laser or a surface emitting semiconductor laser can be used, for example. By using the semiconductor laser, it is possible to provide miniaturized laser light sources 8r, 8g, and 8b.

The dichroic mirror 10r, the dichroic mirror 10g, and the dichroic mirror 10b are disposed according to the disposition of the laser light sources 8r, 8g, and 8b. The dichroic mirror 10r has a property of reflecting the laser light beam 3r. The dichroic mirror 10g has a property of reflecting the laser light beam 3g and transmitting the laser light beam 3r. The dichroic mirror 10b has a property of reflecting the laser light beam 3b and transmitting the laser light beams 3r and 3g. Laser light beams 3r, 3g, and 3b with these colors are synthesized to be the drawing laser light 3 by the dichroic mirrors 10r, 10g, and 10b.

The optical scanner 5 includes a reflection surface 5a as a light reflection unit, and the drawing laser light 3 emitted by the drawing light source unit 4 is emitted to the reflection surface 5a. The optical scanner 5 oscillates the reflection surface 5a by using a horizontal axis 11 as a second axis, and oscillates the reflection surface 5a by using a vertical axis 12 as a first axis. Accordingly, the drawing laser light 3 can be scanned in two directions of the vertical and horizontal directions. That is, the optical scanner 5 has a function of two-dimensionally scanning the drawing laser light 3. The drawing laser light 3 reflected by the reflection surface 5a is reflected by the mirror 6 and emitted to the screen 2. Accordingly, a predetermined pattern is drawn on the screen 2.

Figure 2:
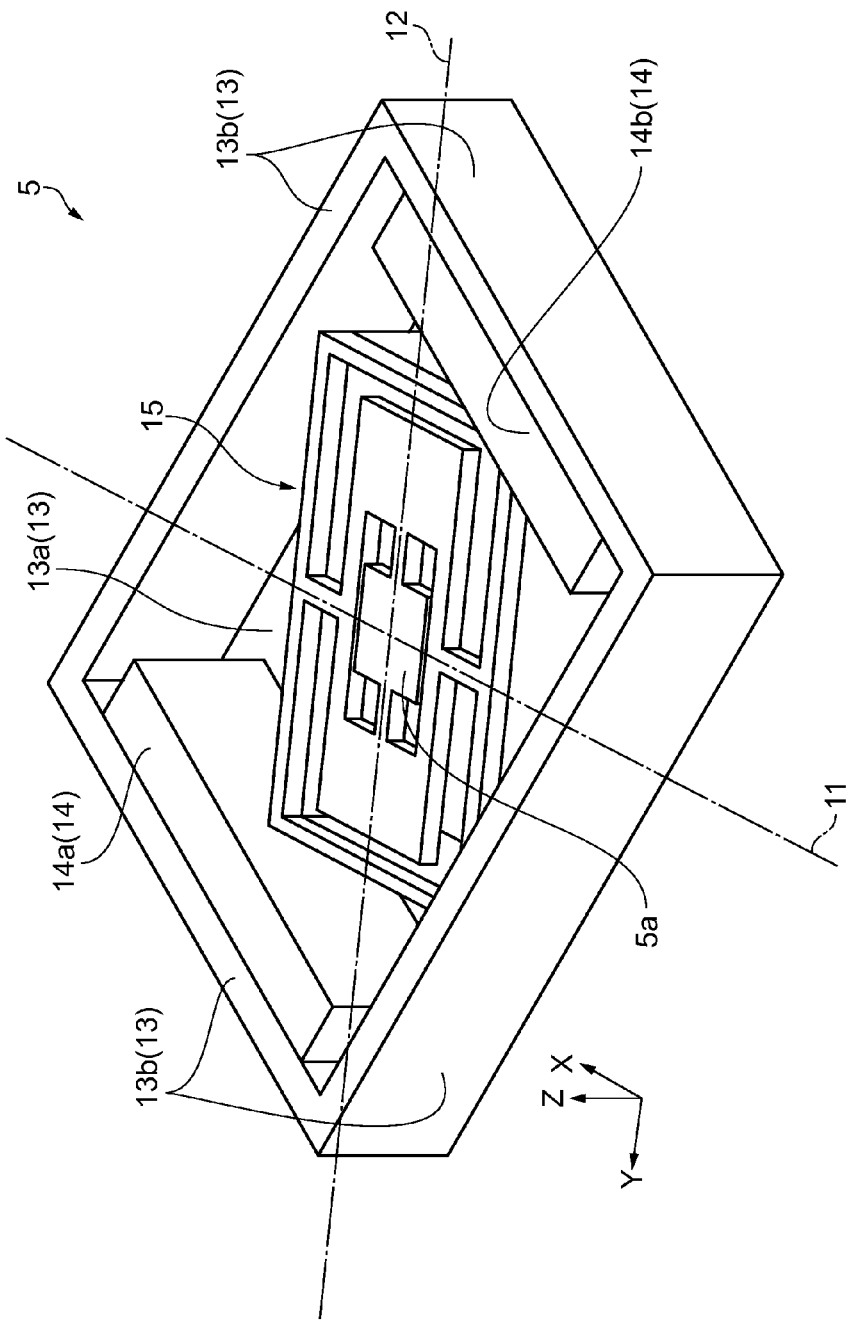
FIG. 2 is a schematic perspective view showing a structure of an optical scanner.

FIG. 2 is a schematic perspective view showing a structure of the optical scanner. As shown in FIG. 2, the optical scanner 5 includes a bottomed square tubular housing 13, and a planar shape of a bottom plate 13a of the housing 13 is a square. A square tubular side plate 13b is provided to stand on the bottom plate 13a. In the housing 13, permanent magnets 14 as a pair of magnets are installed on the bottom plate 13a along the side plate 13b. Among the permanent magnets 14, the permanent magnet 14 at an upper left portion of the drawing is referred to as a first magnet 14a and the permanent magnet 14 at a lower right portion of the drawing is referred to as a second magnet 14b. The first magnet 14a and the second magnet 14b are disposed so as to face each other.

In the housing 13, a structure 15 is disposed between the first magnet 14a and the second magnet 14b. The structure 15 has a shape of a rectangular parallelepiped. A side surface of the structure 15 is disposed so as to be inclined with respect to the side plate 13b of the housing 13. A direction in which one of the side surfaces of the structure 15 extends is set as an X direction. The X direction is a direction in which the horizontal axis 11 extends. A direction orthogonal to the X direction in the side surface of the structure 15 is set as a Y direction. The Y direction is a direction in which the vertical axis 12 extends. A thickness direction of the structure 15 is set as a Z direction. The side plate 13b of the housing 13 extends from the bottom plate 13a in the Z direction. The Z direction is a direction which the reflection surface 5a faces. The X direction, the Y direction, and the Z direction are orthogonal to each other. The drawing laser light 3 is emitted from the Z direction, and the drawing laser light 3 reflected by the reflection surface 5a moves in the Z direction.

Figure 3A:
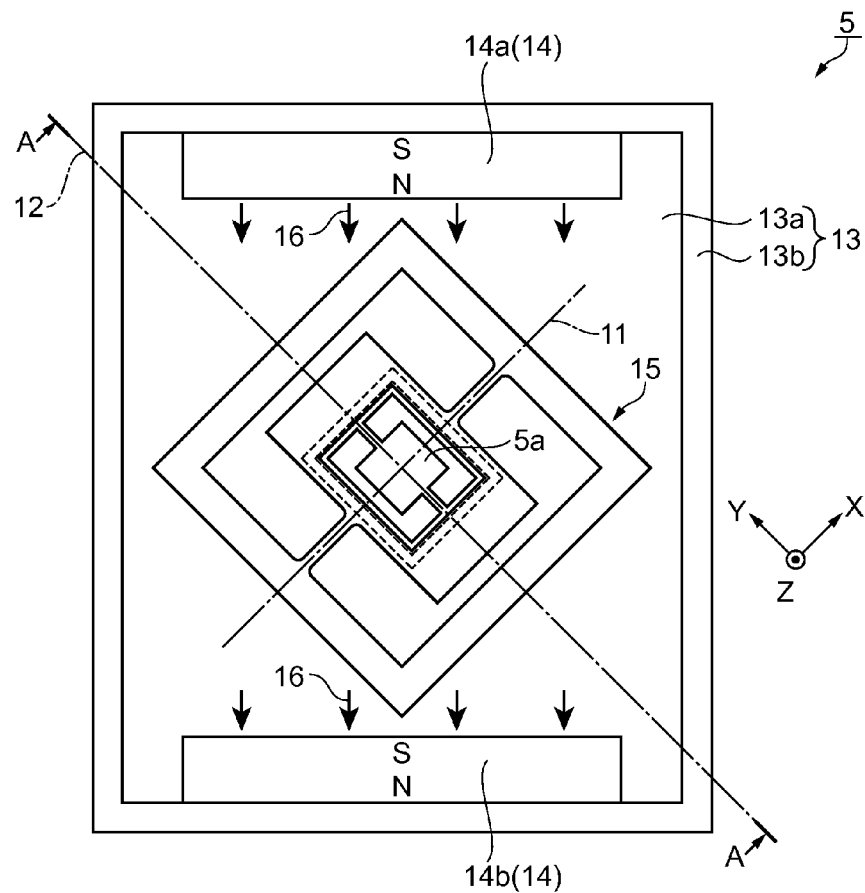
FIG. 3A is a schematic top view showing a structure of an optical scanner and FIG. 3B is a schematic cross-sectional side view showing a structure of an optical scanner.
Figure 3B:
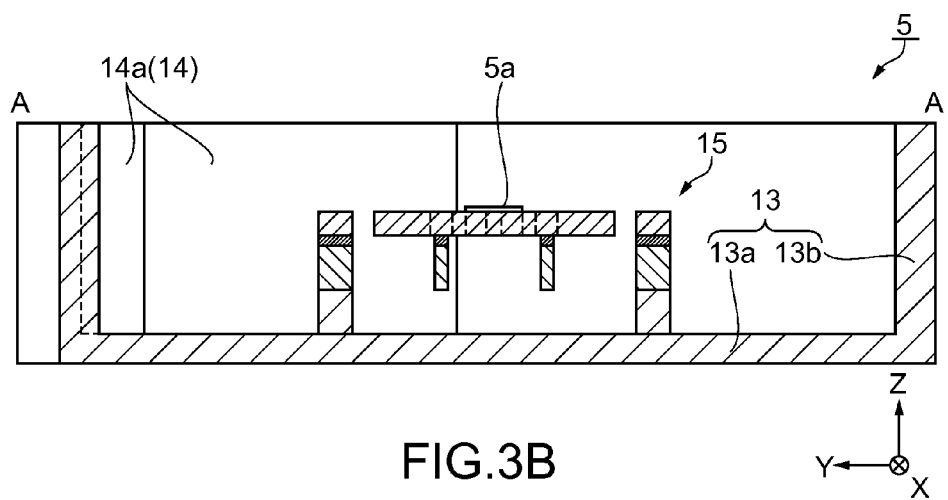

FIG. 3A is a schematic top view showing a structure of the optical scanner and FIG. 3B is a schematic cross-sectional side view showing a structure of the optical scanner. FIG. 3B shows a cross section taken along line A-A of FIG. 3A. As shown in FIG. 3A, a side of the first magnet 14a facing the structure 15 is magnetized to the N pole and a side thereof separated from the structure 15 is magnetized to the S pole. A side of the second magnet 14b facing the structure 15 is magnetized to the S pole and a side thereof separated from the structure 15 is magnetized to the N pole. Accordingly, lines of magnetic force 16 proceed from the N pole of the first magnet 14a on the upper side in the drawing of the structure 15 to the S pole of the second magnet 14b on the lower side in the drawing. The lines of magnetic force 16 pass through the structure 15.

The permanent magnet 14 has a bar shape which extends in a direction to be inclined with respect to both axes of the horizontal axis 11 and the vertical axis 12. The permanent magnet 14 is magnetized in a direction in which a line segment which connects the N pole and the S pole to each other is inclined with respect to the horizontal axis 11 and the vertical axis 12 in a plan view. An inclined angle θ of the magnetization direction (extension direction) of the permanent magnet 14 with respect to the horizontal axis 11 is not particularly limited, and is preferably from 30° to 60° C., more preferably from 45° to 60°, and even more preferably 45°. By providing the permanent magnet 14 as described above, it is possible to smoothly and reliably oscillate the reflection surface 5a around the horizontal axis 11.

As such a permanent magnet 14, a neodymium magnet, a ferrite magnet, a samarium cobalt magnet, an alnico magnet, a bonded magnet, or the like can be used, for example. The permanent magnet 14 is magnetized with a hard magnetic substance.

As shown in FIG. 3B, the structure 15 is installed on the bottom plate 13a and the side plate 13b is installed surrounding the structure 15. Accordingly, since an operator grasps the housing 13 when an operator grasps the optical scanner 5, the optical scanner 5 has a structure hardly coming in contact with the structure 15. Therefore, it is difficult to damage the structure 15 even if the structure 15 has a fragile structure.

Figure 4A:
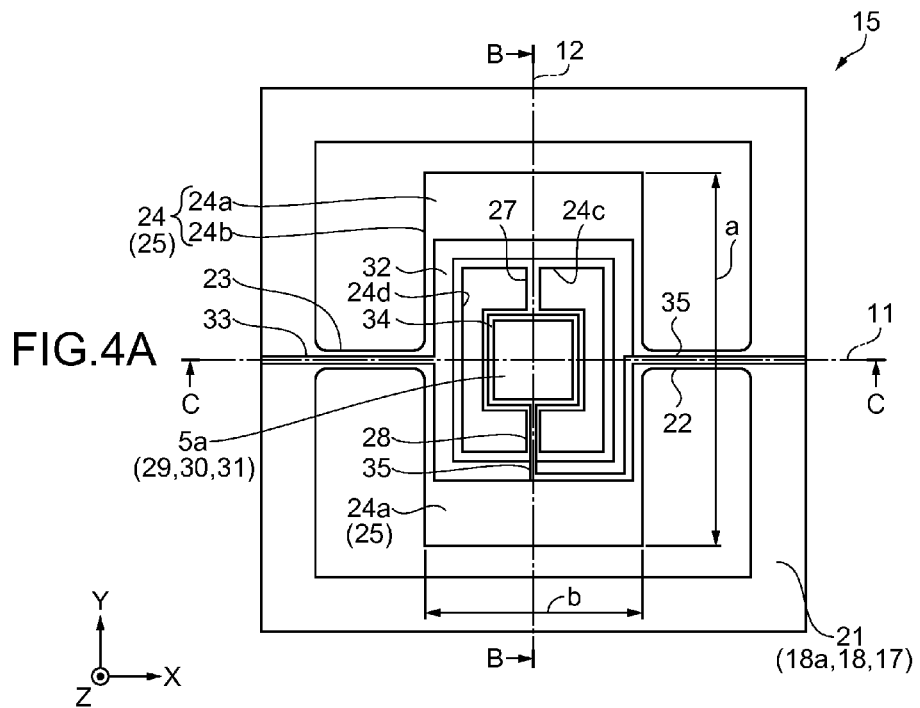
FIG. 4A is a schematic top view showing a structure of a structure and FIG. 4B is a schematic bottom view showing a structure of a structure.
Figure 4B:
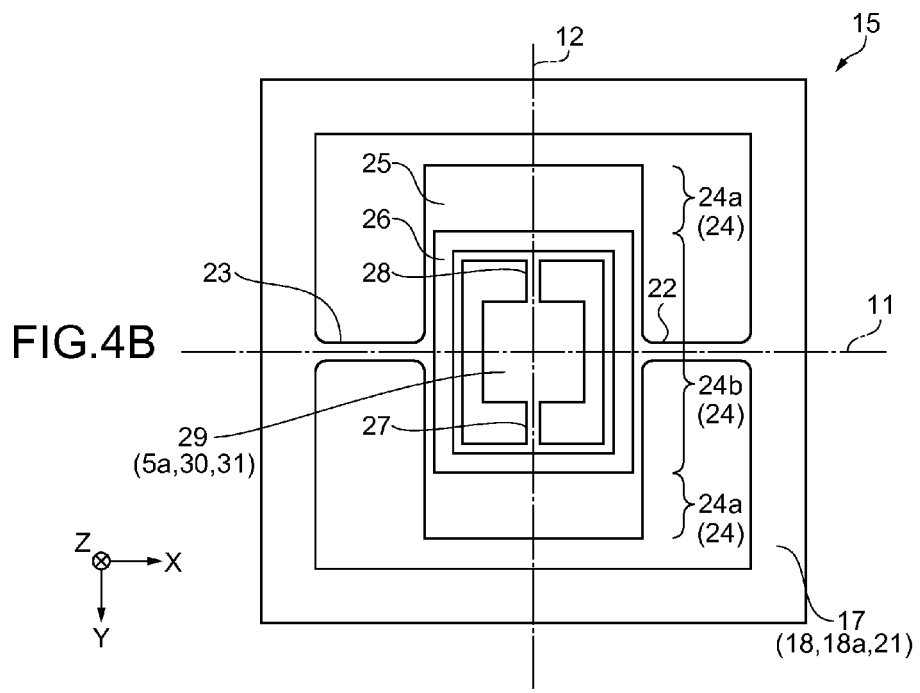
Figure 5A:
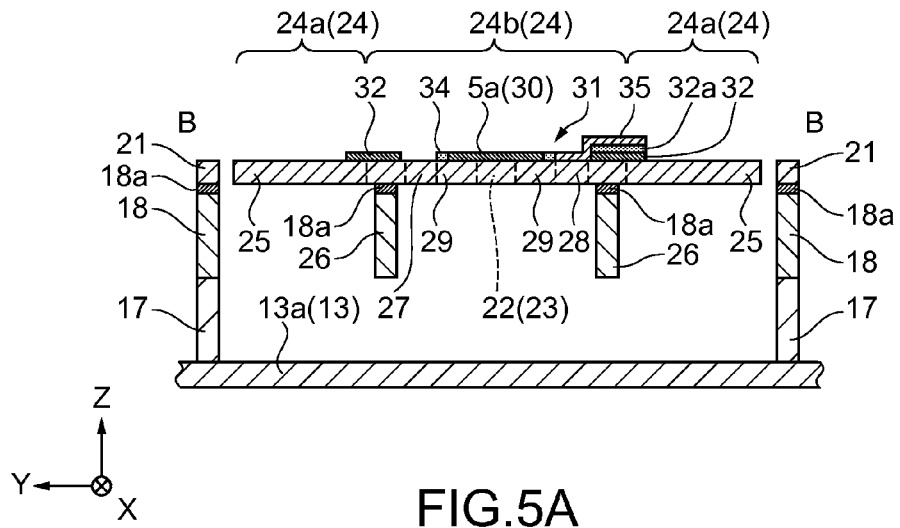
FIGS. 5A and 5B are schematic cross-sectional side views showing a structure of an optical scanner.
Figure 5B:
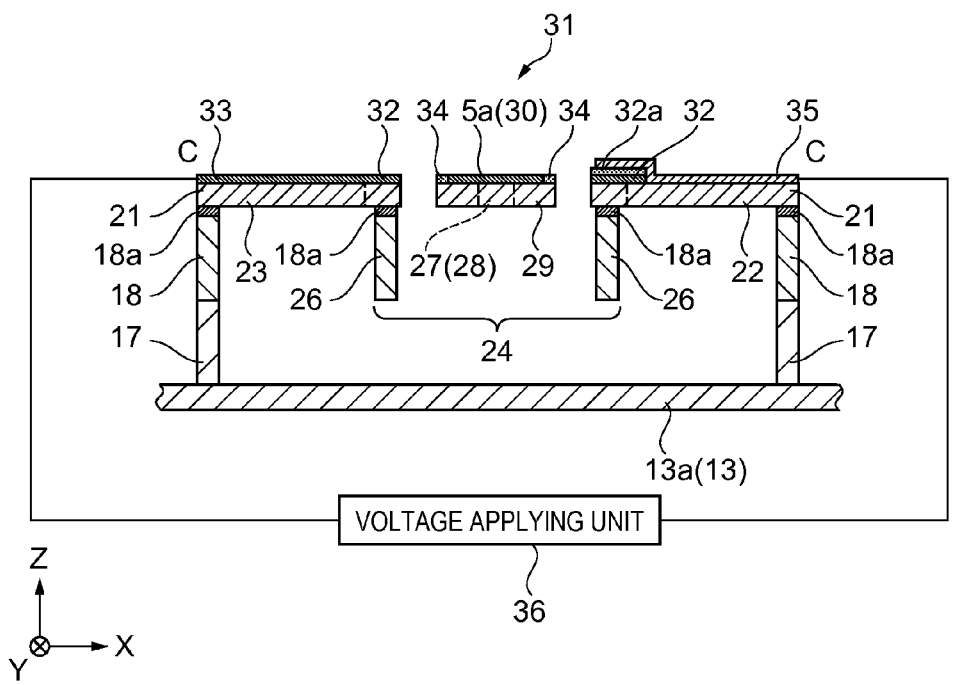

FIG. 4A is a schematic top view showing a structure of the structure and FIG. 4B is a schematic bottom view showing a structure of the structure. FIGS. 5A and 5B are schematic cross-sectional side views showing a structure of the optical scanner. FIG. 5A shows a cross section taken along line B-B of FIG. 4A and FIG. 5B shows a cross section taken along line C-C of FIG. 4A.

As shown in FIGS. 4A to 5B, the structure 15 includes a first square tubular supporting frame portion 17. The first supporting frame portion 17 is installed on the bottom plate 13a. A second square tubular supporting frame portion 18 is installed to be overlapped on the first supporting frame portion 17. The second supporting frame portion 18 is formed of silicon and an oxide film 18a is installed on a surface of the second supporting frame portion 18 facing the Z direction side. A square frame-shaped supporting portion 21 is installed on the Z direction side of the second supporting frame portion 18. The shapes of the supporting portion 21, the first supporting frame portion 17, and the second supporting frame portion 18 in the Z direction are approximately the same.

A third shaft portion 22 and a fourth shaft portion 23 as a second torsion bar spring portion which extends in the X direction are installed at the center of the supporting portion 21 in the Y direction. The third shaft portion 22 and the fourth shaft portion 23 face each other and are disposed along the horizontal axis 11. A displacement portion 24 is installed between the third shaft portion 22 and the fourth shaft portion 23. The displacement portion 24 has a square frame shape and is a rectangle having long sides in the Y direction.

One end of the third shaft portion 22 is connected to the supporting portion 21 and the other end thereof is connected to the displacement portion 24. In the same manner as described above, one end of the fourth shaft portion 23 is connected to the supporting portion 21 and the other end thereof is connected to the displacement portion 24. Accordingly, the third shaft portion 22 and the fourth shaft portion 23 have a structure oscillatably supporting the displacement portion 24.

The third shaft portion 22 and the fourth shaft portion 23 function as a pair of torsion bar springs, and the displacement portion 24 oscillates by using the horizontal axis 11 as a rotation axis. The planar shape of the portions of the third shaft portion 22 and the fourth shaft portion 23 connected to the supporting portion 21 is a circular arc. Accordingly, it is possible to suppress stress concentrated to the portions of the third shaft portion 22 and the fourth shaft portion 23 connected to the supporting portion 21. In the same manner as described above, the planar shape of the portions of the third shaft portion 22 and the fourth shaft portion 23 connected to the displacement portion 24 is circular arc. Accordingly, it is possible to suppress stress concentrated to the portions of the third shaft portion 22 and the fourth shaft portion 23 connected to the displacement portion 24.

The displacement portion 24 is configured with a plate-shaped member 25 and a square tubular portion 26. The square tubular portion 26 is positioned on the negative Z direction side of the plate-shaped member 25 and has a square tubular shape. A part of the displacement portion 24 positioned on the positive Y direction side of the square tubular portion 26 is set as a thin plate structure portion 24a as a damper portion. A part of the displacement portion 24 positioned on the negative Y direction side of the square tubular portion 26 is also set as the thin plate structure portion 24a. Accordingly, the thin plate structure portion 24a, a frame portion 24b, and the thin plate structure portion 24a are disposed in this order on the displacement portion 24 in the Y direction. The thin plate structure portion 24a is configured with a part of the plate-shaped member 25. A part including the square tubular portion 26 and positioned inside of the square tubular portion 26 is set as the frame portion 24b. The frame portion 24b is configured with a part of the plate-shaped member 25 and the square tubular portion 26. A side where the square tubular portion 26 is installed is aside protruding with respect to the thin plate structure portion 24a. A thickness of the thin plate structure portion 24a is a thickness of the plate-shaped member 25, and a thickness of the frame portion 24b is a thickness obtained by adding a thickness of the square tubular portion 26 to the thickness of the plate-shaped member 25. Accordingly, the thin plate structure portion 24a has a small thickness and the frame portion 24b has a great thickness.

A first shaft portion 27 as a first torsion bar spring portion and a second shaft portion 28 as a first torsion bar spring portion which extend in the Y direction are installed at the center of the displacement portion 24 in the X direction. The first shaft portion 27 and the second shaft portion 28 face each other and are disposed according to the vertical axis 12. A movable plate 29 is installed between the first shaft portion 27 and the second shaft portion 28. The movable plate 29 has a square shape, and a surface on the Z direction side of the movable plate 29 is set as the reflection surface 5a. A hole positioned on the positive X direction side of the first shaft portion 27 and the second shaft portion 28 in the displacement portion 24 is set as a first hole 24c, and a hole positioned on the negative X direction side of the first shaft portion 27 and the second shaft portion 28 is set as a second hole 24d.

One end of the first shaft portion 27 is connected to the plate-shaped member 25 and the other end thereof is connected to the movable plate 29. In the same manner as described above, one end of the second shaft portion 28 is connected to the plate-shaped member 25 and the other end thereof is connected to the movable plate 29. Accordingly, the first shaft portion 27 and the second shaft portion 28 have a structure oscillatably supporting the movable plate 29. The first shaft portion 27 and the second shaft portion 28 function as a pair of torsion bar springs, and the movable plate 29 oscillates by using the vertical axis 12 as a rotation axis.

The movable plate 29, the first shaft portion 27, and the second shaft portion 28 configure a first vibration system for performing oscillation or reciprocating by using the vertical axis 12 as a rotation axis. The first shaft portion 27 and the second shaft portion 28 function as torsion bar springs, and the first shaft portion 27 and the second shaft portion 28 have a predetermined spring constant. A natural frequency when the movable plate 29 oscillates is determined by the spring constant of the first shaft portion 27 and the second shaft portion 28 and mass of the movable plate 29. The torsion bar spring is also referred to as a torsion bar. The displacement portion 24, the movable plate 29, the first shaft portion 27, the second shaft portion 28, the third shaft portion 22, and the fourth shaft portion 23 configure a second vibration system for performing oscillation or reciprocating by using the horizontal axis 11 as a rotation axis.

A reflection film 30 as a light reflection unit is installed on the surface of the movable plate 29 facing the Z direction side, and a part of the drawing laser light beam 3 to be emitted is reflected by the reflection surface 5a which is a surface of the reflection film 30. A reflector 31 as a light reflection unit is configured with the movable plate 29 and the reflection film 30.

A second coil 32 as a coil is installed to surround the movable plate 29 on a surface of the displacement portion 24 facing the Z direction side. The second coil 32 is disposed in a position facing the square tubular portion 26. A second wire 33 is installed on the fourth shaft portion 23 so as to be connected to the second coil 32. The second wire 33 is installed from the second coil 32 to the supporting portion 21 through the upper portion of the fourth shaft portion 23.

A first coil 34 is installed to surround the reflection film 30 on a surface of the movable plate 29 facing the Z direction side. The first coil 34 is disposed along the periphery of the movable plate 29. The first coil 34 and the second coil 32 are planar coils in which a conductive wire is disposed in a spiral manner. A first wire 35 is installed on the second shaft portion 28 so as to be connected to the first coil 34. The first wire 35 is installed from the second shaft portion 28 to the supporting portion 21 through the upper portion of the second coil 32 and the third shaft portion 22. Since an insulation film 32a is disposed between the second coil 32 and the first wire 35, the second coil 32 and the first wire 35 are insulated from each other. The first coil 34 and the second coil 32 are connected to a voltage applying unit 36. By applying a voltage to the first coil 34 and the second coil 32 by the voltage applying unit 36, a magnetic field having a magnetic flux orthogonal to the horizontal axis 11 and the vertical axis 12 is generated from the first coil 34 and the second coil 32. The permanent magnet 14, the first coil 34, the second coil 32, and the voltage applying unit 36 configure a driving unit which drives the first vibration system and the second vibration system described above.

The movable plate 29 oscillates by using the vertical axis 12 as a rotation axis, and the displacement portion 24 oscillates by using the horizontal axis 11 as a rotation axis. Accordingly, the movable plate 29 and the reflection surface 5a can oscillate around two axes of the horizontal axis 11 and the vertical axis 12 which are orthogonal to each other. The shapes of the first shaft portion 27, the second shaft portion 28, the third shaft portion 22, and the fourth shaft portion 23 are not limited as described above, and may have at least a bent or curved portion or a branched portion in the middle thereof, for example. Each of the first shaft portion 27, the second shaft portion 28, the third shaft portion 22, and the fourth shaft portion 23 may be divided into two and be formed as two shafts.

A length of the displacement portion 24 in a direction along the vertical axis 12 is greater than a length thereof in a direction along the horizontal axis 11. That is, when a length of the displacement portion 24 in a direction along the vertical axis 12 is set as a and a length of the displacement portion 24 in a direction along the horizontal axis 11 is set as b, a relationship of a>b is satisfied. Accordingly, it is possible to reduce a length of the optical scanner 5 in a direction along the horizontal axis 11, while securing a length desired for the first shaft portion 27 and the second shaft portion 28. It is possible to easily respond to the oscillation of the displacement portion 24 using the horizontal axis 11 as a rotation axis with respect to a low frequency, and to easily respond to the oscillation of the movable plate 29 using the vertical axis 12 as a rotation axis with respect to a high frequency.

The supporting portion 21, the third shaft portion 22, the fourth shaft portion 23, the plate-shaped member 25, the first shaft portion 27, the second shaft portion 28, and the movable plate 29 are integrally formed on a first Si layer (device layer). The portions described above and the square tubular portion 26 are formed by etching an SOI substrate obtained by laminating the first Si layer (device layer), the oxide film 18a (box layer), and a second Si layer (handle layer) in this order. The square tubular portion 26 and the second supporting frame portion 18 are formed from the second Si layer. Fine processing can be performed on the SOI substrate by etching. Since the supporting portion 21, the third shaft portion 22, the fourth shaft portion 23, the plate-shaped member 25, the first shaft portion 27, the second shaft portion 28, the movable plate 29, the square tubular portion 26, and the second supporting frame portion 18 are formed by using the SOI substrate, it is possible to obtain excellent dimensional accuracy of these portions. Accordingly, it is possible to obtain excellent vibration properties of the first vibration system and the second vibration system.

The second supporting frame portion 18 is disposed on the bottom plate 13a side of the supporting portion 21. The second supporting frame portion 18 increases the strength of the supporting portion 21. The second supporting frame portion 18 surrounds the square tubular portion 26 in the X and Y directions. Accordingly, when an operator grasps the structure 15, it is possible to prevent stress applied to the third shaft portion 22 and the fourth shaft portion 23 by grasping the second supporting frame portion 18. The second supporting frame portion 18 is formed of silicon and an oxide film 18a is formed on a surface of the second supporting frame portion 18 on the supporting portion 21 side.

The dimensions of each member are not particularly limited, but in the embodiment, dimensions of each portion are set to the following values, for example. A length of the structure 15 in the X direction is 7000 μm and a length thereof in the Y direction is 4000 μm. A length of the optical scanner 5 in the Z direction is 3000 μm. A height of the first supporting frame portion 17 is 1000 μm and a height of the second supporting frame portion 18 is from 200 μm to 300 μm. A length of the hole inside of the supporting portion 21 in the X direction is 5900 μm.

A length of the plate-shaped member 25 in the X direction is 2300 μm and a length thereof in the Y direction is 3500 μm. A thickness of the plate-shaped member 25 is 40 μm. A length of the first hole 24c and the second hole 24d in the Y direction is 2000 μm. A width of the square tubular portion 26 is from 50 μm and 100 μm and a length thereof in the Z direction is from 200 μm to 300 μm. A length from an edge of the square tubular portion 26 in the Y direction to an edge of the displacement portion 24 in the Y direction is 750 μm.

The movable plate 29 is a square in which a length of one side is 1000 μm. A width of the permanent magnet 14 is 3000 μm and a length thereof is 5000 μm. A length of the permanent magnet 14 in the Z direction is 3000 μm.

Figure 6A:
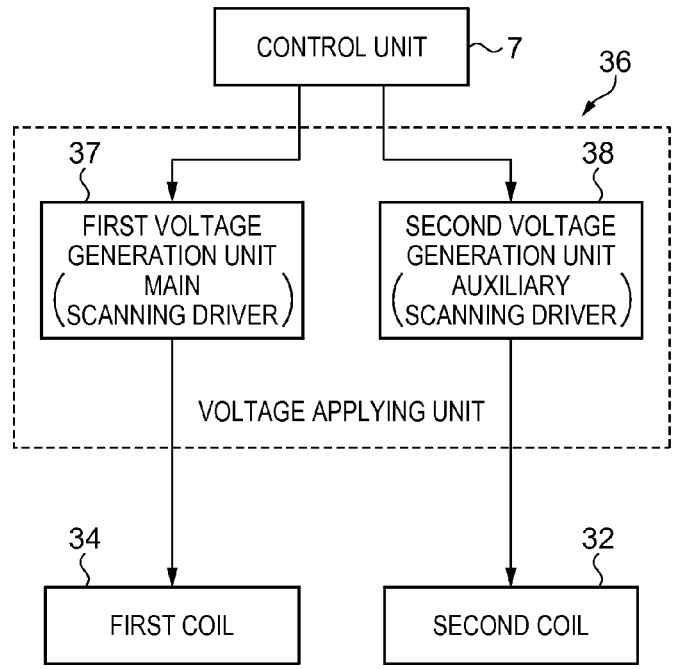
FIG. 6A is an electrical block diagram showing a configuration of a voltage applying unit.

FIG. 6A is an electrical block diagram showing a configuration of the voltage applying unit. As shown in FIG. 6A, the voltage applying unit 36 includes a first voltage generation unit 37 which generates a first voltage waveform for oscillating the movable plate 29 by using the vertical axis 12 as a rotation axis. The first voltage generation unit 37 outputs a voltage to the first coil 34. The voltage applying unit 36 further includes a second voltage generation unit 38 which generates a second voltage waveform for oscillating the movable plate 29 by using the horizontal axis 11 as a rotation axis. The second voltage generation unit 38 outputs a voltage to the second coil 32. The voltage applying unit 36 is connected to the control unit 7. The control unit 7 controls the first voltage generation unit 37 and the second voltage generation unit 38. The first voltage generation unit 37 drives the first coil 34 and the second voltage generation unit 38 drives the second coil 32 based on a signal from the control unit 7.

Figure 6B:
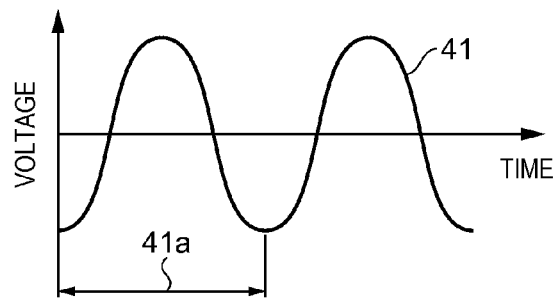
FIG. 6B is a diagram illustrating a first voltage waveform.

FIG. 6B is a diagram illustrating the first voltage waveform. In FIG. 6B, a vertical axis indicates a voltage and a horizontal axis indicates elapsed time. A first voltage waveform 41 indicates a waveform of a voltage output by the first voltage generation unit 37. The first voltage waveform 41 forms a waveform such as a sine wave which periodically changes in a first period 41a. A frequency of the first voltage waveform 41 is, for example, preferably from 18 kHz to 30 kHz. In the embodiment, the frequency of the first voltage waveform is, for example, set to be equivalent to a torsional resonance frequency (f1) of the first vibration system configured with the movable plate 29, the first shaft portion 27, and the second shaft portion 28. Accordingly, it is possible to increase an oscillation angle of the movable plate by using the vertical axis 12 as a rotation axis. Alternatively, it is possible to suppress power used for oscillating the movable plate 29.

Figure 6C:
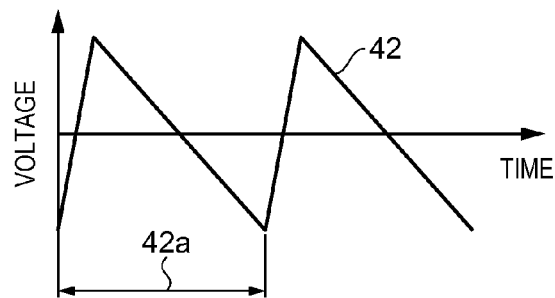
FIG. 6C is a diagram illustrating a second voltage waveform.

FIG. 6C is a diagram illustrating the second voltage waveform. In FIG. 6C, a vertical axis indicates a voltage and a horizontal axis indicates elapsed time. A second voltage waveform 42 indicates a waveform of a voltage output by the second voltage generation unit 38. The second voltage waveform 42 forms a waveform such as a saw-tooth wave which periodically changes in a second period 42a which is longer than the first period 41a. A frequency of the second voltage waveform 42 is lower than the frequency of the first voltage waveform 41, and is, for example, preferably from 60 Hz to 120 Hz. In the embodiment, the frequency of the second voltage waveform 42 is adjusted so as to be a frequency different from a torsional resonance frequency (f2) of the second vibration system configured with the movable plate 29, the first shaft portion 27, the second shaft portion 28, the displacement portion 24, the third shaft portion 22, and the fourth shaft portion 23. The frequency of the second voltage waveform 42 is set to be smaller than the frequency of the first voltage waveform 41. Accordingly, it is possible to oscillate the movable plate 29 at the frequency of the first voltage waveform 41 by using the vertical axis 12 as a rotation axis and to oscillate the movable plate 29 at the frequency of the second voltage waveform 42 by using the horizontal axis 11 as a rotation axis, in a more reliable and smooth manner.

When the torsional resonance frequency of the first vibration system is set as f1 (Hz) and the torsional resonance frequency of the second vibration system is set as f2 (Hz), it is preferable that f1 and f2 satisfy a relationship of f2<f1. Accordingly, it is possible to oscillate the movable plate 29 at the frequency of the first voltage waveform 41 by using the vertical axis 12 as a rotation axis and to oscillate the movable plate 29 at the frequency of the second voltage waveform 42 by using the horizontal axis 11 as a rotation axis, in a more smooth manner.

Next, the driving method of the optical scanner 5 will be described. The frequency of the first voltage waveform 41 is set to be equivalent to the torsional resonance frequency of the first vibration system. The frequency of the second voltage waveform 42 is set to be lower than the frequency of the first voltage waveform 41.

The voltage applying unit 36 outputs a voltage waveform of the first voltage waveform 41 to the first coil 34. Since the lines of magnetic force 16 act on the first coil 34, an electromagnetic force in a predetermined direction acts on the first coil 34. Accordingly, the movable plate 29 is twisted by using the first shaft portion 27 and the second shaft portion 28 as rotation axes. The first voltage waveform 41 is a waveform similar to a sine wave and causes inversion of a direction of current flowing through the first coil 34. Accordingly, a direction of an electromagnetic force acting on the first coil 34 is inverted. Since a direction of an electromagnetic force acting on the first coil 34 is inverted at time intervals of half of the first period 41a, the movable plate 29 oscillates by using the first shaft portion 27 and the second shaft portion 28 as rotation axes. Vibration having a torsional vibration component using the vertical axis 12 as a rotation axis is excited on the movable plate 29. The first shaft portion 27 and the second shaft portion 28 are twisted and deformed with this vibration, and the movable plate 29 oscillates at the frequency of the first voltage waveform 41 by using the vertical axis 12 as a rotation axis. Since the frequency of the first voltage waveform 41 is equivalent to the torsional resonance frequency of the first vibration system, the first coil 34 can cause the movable plate 29 to greatly oscillate by the resonance vibration.

The voltage applying unit 36 outputs a voltage waveform of the second voltage waveform 42 to the second coil 32. Since the lines of magnetic force 16 act on the second coil 32, an electromagnetic force in a predetermined direction acts on the second coil 32. Accordingly, the displacement portion 24 is twisted by using the third shaft portion 22 and the fourth shaft portion 23 as rotation axes. The second voltage waveform 42 is a triangular wave and causes inversion of a direction of current flowing through the second coil 32. Accordingly, a direction of an electromagnetic force acting on the second coil 32 is inverted. Since a direction of an electromagnetic force acting on the second coil 32 is inverted at time intervals of half of the second period 42a, the movable plate 29 oscillates by using the third shaft portion 22 and the fourth shaft portion 23 as rotation axes. Vibration having a torsional vibration component using the horizontal axis 11 as a rotation axis is excited on the displacement portion 24. The third shaft portion 22 and the fourth shaft portion 23 are twisted and deformed with this vibration, and the movable plate 29 oscillates at the frequency of the second voltage waveform 42 by using the horizontal axis 11 as a rotation axis.

The frequency of the second voltage waveform 42 is set to be extremely lower than the frequency of the first voltage waveform 41. The torsional resonance frequency of the second vibration system is set to be even lower than the torsional resonance frequency of the first vibration system. Accordingly, the oscillation of the movable plate 29 at the frequency of the second voltage waveform 42 by using the vertical axis 12 as a rotation axis is suppressed.

As described above, in the optical scanner 5, the voltage applying unit 36 outputs the first voltage waveform 41 to the first coil 34 and outputs the second voltage waveform 42 to the second coil 32. Accordingly, the movable plate 29 is oscillated at the frequency of the first voltage waveform 41 by using the vertical axis 12 as a rotation axis, and the movable plate is oscillated at the frequency of the second voltage waveform 42 by using the horizontal axis 11 as a rotation axis. The movable plate 29 is oscillated around the axes of the horizontal axis 11 and the vertical axis 12, and accordingly the drawing laser light 3 reflected by the reflection film 30 is two-dimensionally scanned.

The control unit 7 has a function of controlling the operations of the drawing light source unit 4 and the optical scanner 5. In detail, the control unit 7 drives the optical scanner 5 so as to cause the movable plate 29 to oscillate by using the horizontal axis 11 and the vertical axis 12 as rotation axes. In addition, the control unit 7 synchronizes the light with the oscillation of the movable plate 29, and emits the drawing laser light 3 from the drawing light source unit 4. The control unit 7 includes an interface (not shown), and the control unit 7 inputs image data transmitted from an external computer through the interface. The control unit 7 emits the laser light beams 3r, 3g, and 3b with a predetermined intensity from the laser light sources 8r, 8g, and 8b at a predetermined timing based on the image data. Accordingly, the optical scanner 5 emits the drawing laser light 3 with a predetermined color and light intensity at a predetermined timing. Thus, an image corresponding to the image data is displayed on the screen 2.

FIGS. 7A to 7C are schematic views illustrating operations of the displacement portion. FIG. 7A is a diagram when the displacement portion 24 is rotated clockwise by using the horizontal axis 11 as a rotation axis. FIG. 7B is a diagram when the displacement portion 24 is horizontal. FIG. 7C is a diagram when the displacement portion 24 is rotated counterclockwise by using the horizontal axis 11 as a rotation axis.

When the voltage applying unit 36 is electrically connected to the second coil 32, the displacement portion 24 is driven by the second voltage waveform 42. The displacement portion 24 oscillates by using the third shaft portion 22 and the fourth shaft portion 23 as rotation axes in the order of FIG. 7A, FIG. 7B, FIG. 7C, FIG. 7B, and FIG. 7A.

One end of each of the first shaft portion 27 and the second shaft portion 28 supports the movable plate 29 and the other end of each of the first shaft portion 27 and the second shaft portion 28 is connected to the displacement portion 24. The displacement portion 24 is supported by the third shaft portion 22 and the fourth shaft portion 23. A direction in which the first shaft portion 27 and the second shaft portion 28 extend, and a direction in which the third shaft portion 22 and the fourth shaft portion 23 extend are orthogonal to each other. The movable plate 29 oscillates around the vertical axis 12, and the displacement portion 24 oscillates around the horizontal axis 11. Accordingly, the movable plate 29 oscillates around axes in two directions orthogonal to each other.

The permanent magnet 14 is fixed to the housing 13. The displacement portion 24 is driven by the magnetic field on the permanent magnet 14 and the second coil 32. By driving the displacement portion 24 with the electrical connection of the second coil 32, the optical scanner 5 can cause the movable plate 29 including the reflection surface 5a to oscillate around axes in two directions intersecting with each other.

The displacement portion 24 includes the thick frame portion 24b and the thin plate structure portion 24a. The frame portion 24b is positioned to be close to the third shaft portion 22 and the fourth shaft portion 23 and the thin plate structure portion 24a is positioned at a location separated from the third shaft portion 22 and the fourth shaft portion 23. The inertia moment of the displacement portion 24 of the optical scanner 5 is decreased, compared to when the thickness of the thin plate structure portion 24a is the same as the thickness of the frame portion 24b. As the inertia moment of the displacement portion becomes smaller, the power consumed for driving the displacement portion 24 can be reduced. Accordingly, it is possible to reduce the power consumed for driving the optical scanner 5.

When the displacement portion 24 oscillates around the axes of the third shaft portion 22 and the fourth shaft portion 23, an air current 43 is generated around the frame portion 24b and the thin plate structure portion 24a. The thin plate structure portion 24a functions as a damper which attenuates the rotation rate due to the air current 43. Accordingly, it is possible to set the displacement portion 24 to resist reacting with respect to the driving of the first voltage waveform 41 having a high frequency. Thus, when the movable plate 29 oscillates around the third shaft portion 22 and the fourth shaft portion 23, it is possible to set the movable plate 29 to be hardly affected by the driving of the first voltage waveform 41 having a high frequency. As a result, it is possible to improve the vibration performance of the movable plate 29. That is, the movable plate 29 can oscillate by using the vertical axis 12 as an axis in accordance with the first voltage waveform 41, and the displacement portion 24 can oscillate by using the horizontal axis 11 as an axis in accordance with the second voltage waveform 42. When the movable plate 29 oscillates around the horizontal axis 11, the displacement portion 24 can be oscillated so as not to be affected by the first voltage waveform 41.

Figure 8A:
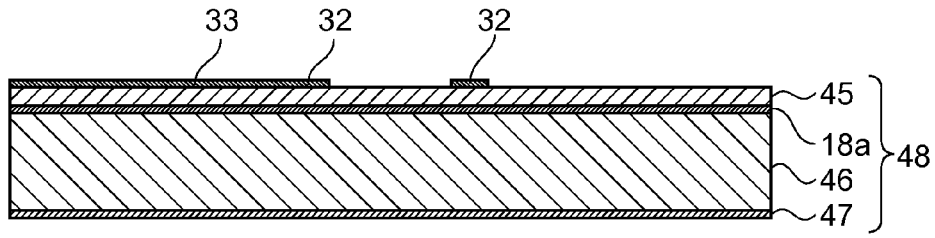
FIGS. 8A to 8D are schematic views illustrating a manufacturing method of an optical scanner.

FIGS. 8A to 9D are schematic views illustrating a manufacturing method of the optical scanner. Next, the manufacturing method of the optical scanner 5 will be described with reference to FIGS. 8A to 9D. First, apart of the structure 15 is manufactured. As shown in FIG. 8A, a laminated substrate 48 in which a first silicon layer 45, the oxide film 18a, a second silicon layer 46, and a mask oxide film 47 from the top of the drawing are laminated on each other is prepared. The oxide film 18a and the mask oxide film 47 are layers formed of silicon dioxide. A thickness of each layer is not particularly limited, but in the embodiment, for example, a thickness of the first silicon layer 45 is set to be approximately 40 µm, a thickness of the oxide film 18a is set to be approximately 0.5 µm, a thickness of the second silicon layer 46 is set to be approximately 250 µm, and a thickness of the mask oxide film 47 is set to be approximately 0.5 µm.

Next, the second coil 32 is installed on the first silicon layer 45 and the second wire 33 is installed on a portion from the fourth shaft portion 23 to the supporting portion 21. After forming a metal film by a sputtering method and a vapor deposition method, the second coil 32 and the second wire 33 can be formed by forming a resist film and using a photolithography and an etching method. A metal wire can be formed by using a well-known method such as plating, and therefore the detailed description thereof will be omitted. The metal wire can also be formed by an ink jet method, in addition to offset printing, screen printing, and letterpress printing, other than a method of plating.

Figure 8B:
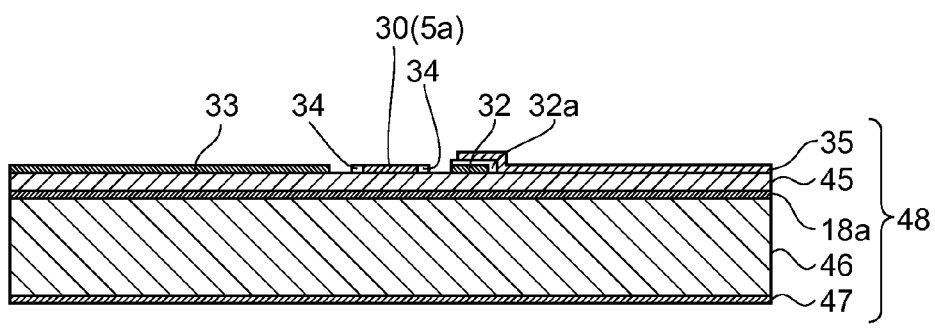

Next, as shown in FIG. 8B, the insulation film 32a is disposed on a part of the second coil 32. The insulation film 32a is disposed at a predetermined position where the second coil 32 and the first wire 35 are overlapped in a plan view seen from the Z direction. The insulation film 32a can be formed by printing a resin material having an insulating property. In the printing, an ink jet method can be used in addition to offset printing, screen printing, and letterpress printing.

Next, the first coil 34 and the first wire 35 are installed. The first coil 34 is installed on the first silicon layer 45. The first wire 35 is installed on the first silicon layer 45 and the insulation film 32a. Since the first coil 34 and the first wire 35 are connected to each other, the first coil 34 and the first wire 35 may be formed at the same time. As the forming method of the first coil 34 and the first wire 35, the same forming method as the forming method of the second coil 32 and the second wire 33 can be used. The description of the forming method of the first coil 34 and the first wire 35 will be omitted.

Next, the reflection film 30 is formed on the first silicon layer 45. The material of the reflection film 30 is formed by a method such as vapor deposition and sputtering. The first silicon layer 45 may be polished to set a mirror surface, before forming the reflection film 30. Accordingly, the drawing laser light 3 can be reflected at an angle with excellent precision. A step of polishing the first silicon layer 45 to set a mirror surface is not particularly limited, and it is preferable to perform the step before installing the resist layer 44.

Figure 8C:
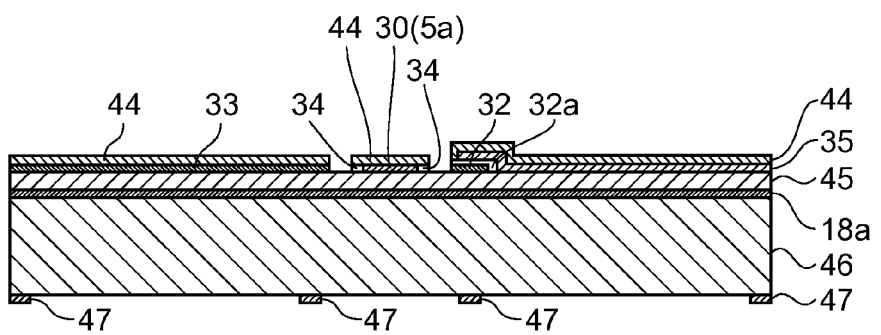

Next, as shown in FIG. 8C, the resist layer 44 is coated. The resist layer 44 is coated by covering the reflection film 30, the second coil 32, the second wire 33, the first coil 34, and the first wire 35. Next, the resist layer 44 and the mask oxide film 47 are patterned. The resist layer 44 is patterned in the shape of the movable plate 29, the first shaft portion 27, the second shaft portion 28, the plate-shaped member 25, the third shaft portion 22, the fourth shaft portion 23, and the supporting portion 21. The mask oxide film 47 is patterned in the shape of the second supporting frame portion 18 and the square tubular portion 26.

Figure 8D:
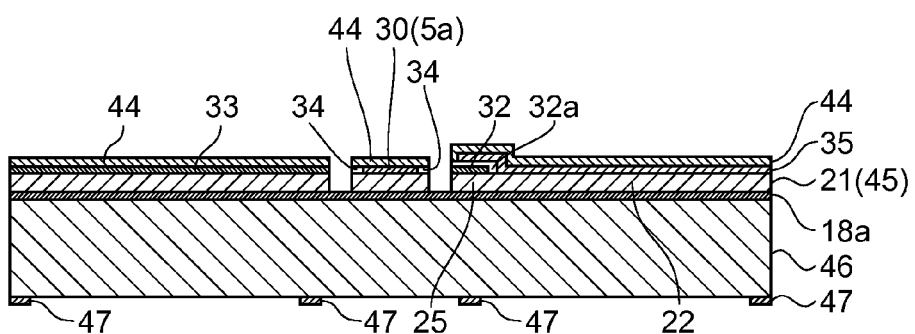

Next, as shown in FIG. 8D, the first silicon layer 45 is subjected to dry etching by using the resist layer 44 as a mask. The movable plate 29, the first shaft portion 27, the second shaft portion 28, the plate-shaped member 25, the third shaft portion 22, the fourth shaft portion 23, and the supporting portion 21 are formed by this etching.

Figure 9A:
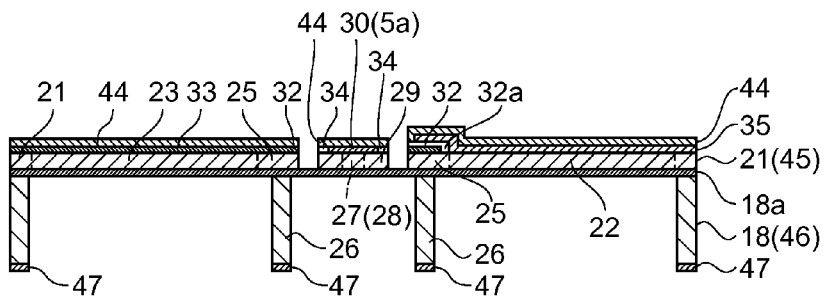
FIGS. 9A to 9D are schematic views illustrating a manufacturing method of an optical scanner.
Figure 9B:
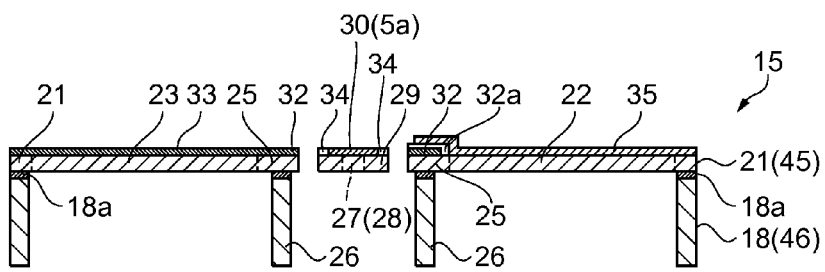

Next, as shown in FIG. 9A, the second silicon layer 46 is subjected to etching by an etching method such as dry etching, for example. At that time, the mask oxide film 47 is used as a mask. The second supporting frame portion 18 and the square tubular portion 26 are formed. Next, as shown in FIG. 9B, an exposed part of the oxide film 18a and the mask oxide film 47 are etched and removed. In addition, the resist layer 44 is peeled off and removed.

When forming the plurality of structures 15 on one silicon wafer, the structures 15 are cut by a method such as dicing. As described above, a part of the structure 15 is obtained.

Figure 9C:
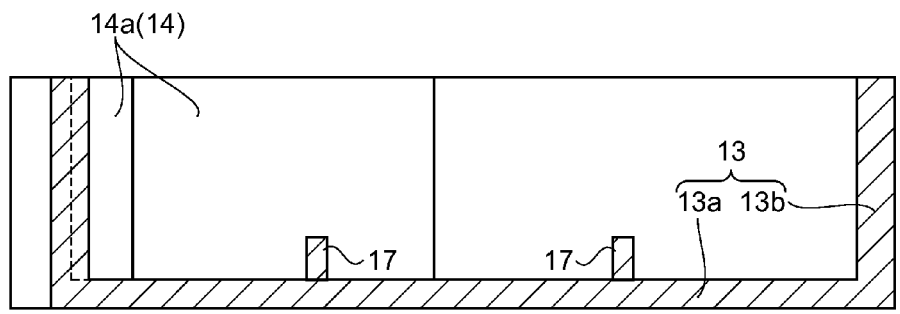
Figure 9D:
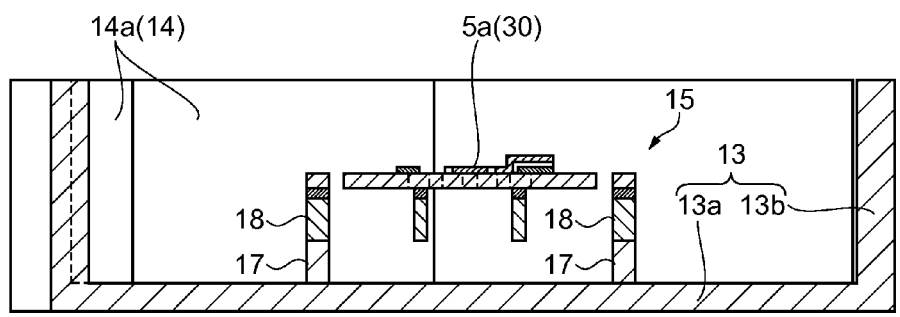

Next, as shown in FIG. 9C, the housing 13 in which the permanent magnet 14 and the first supporting frame portion 17 are installed on the bottom plate 13a is prepared. The permanent magnet 14 and the first supporting frame portion 17 can be adhered to the housing 13 by using an adhesive material. Next, as shown in FIG. 9D, the first supporting frame portion 17 and the second supporting frame portion 18 are adhered to be overlapped with each other. As described above, the optical scanner 5 is completed.

As described above, according to the embodiment, the following effects are obtained.

(1) According to the embodiment, the displacement portion 24 includes the frame portion 24b and the thin plate structure portion 24a. The thin plate structure portion 24a extends in a direction orthogonal to the direction in which the third shaft portion 22 and the fourth shaft portion 23 extend from the frame portion 24b. When the displacement portion 24 oscillates around the third shaft portion 22 and the fourth shaft portion 23, the thin plate structure portion 24a functions as a damper by generating the air current around the thin plate structure portion. Accordingly, it is possible to set the displacement portion 24 to resist reacting with respect to the high frequency driving. Thus, when the reflector 31 oscillates around the third shaft portion 22 and the fourth shaft portion 23, it is possible to set the reflector to resist reacting with respect to the high frequency driving. As a result, it is possible to improve the vibration performance of the reflector 31.

(2) According to the embodiment, the lengths of the displacement portion 24 in the two directions intersecting with each other are different from each other. When the length of the displacement portion 24 in a direction along the vertical axis 12 is set as a and the length of the displacement portion 24 in a direction along the horizontal axis 11 is set as b, a relationship of a>b is satisfied. Accordingly, when the displacement portion 24 oscillates around the third shaft portion 22 and the fourth shaft portion 23, a movement amount of the thin plate structure portion 24a increases, compared to when the displacement portion oscillates around the first shaft portion 27 and the second shaft portion 28. Accordingly, when the displacement portion oscillates around the third shaft portion 22 and the fourth shaft portion 23, resistance increases, compared to when the displacement portion oscillates around the first shaft portion 27 and the second shaft portion 28. As a result, it is possible to set the displacement portion 24 to resist reacting around the third shaft portion 22 and the fourth shaft portion 23 with respect to the high frequency driving.

Second Embodiment

Figure 10A:
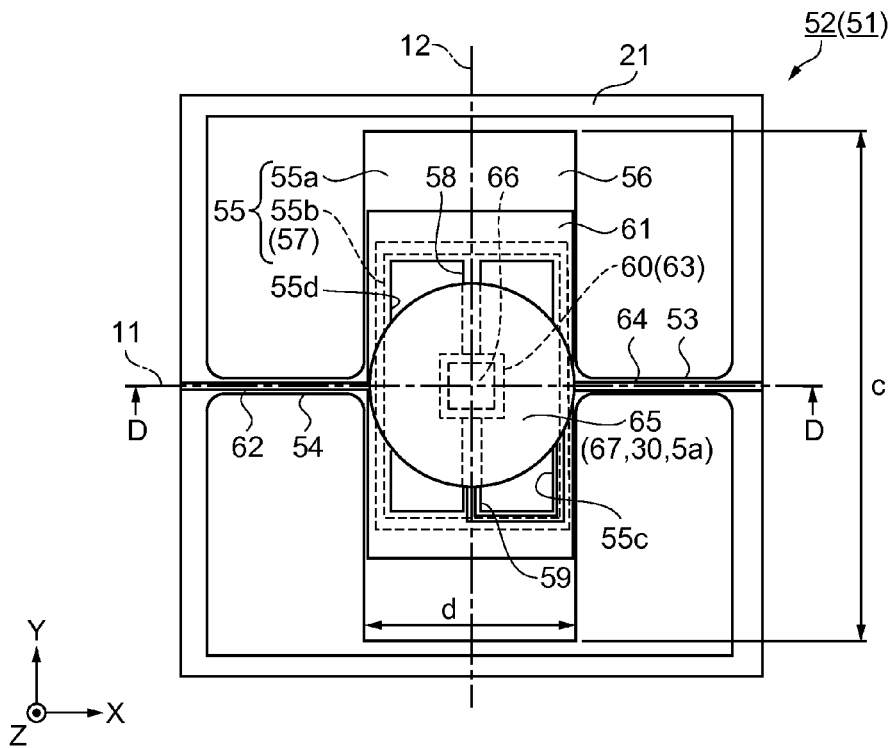
Figure 10B:
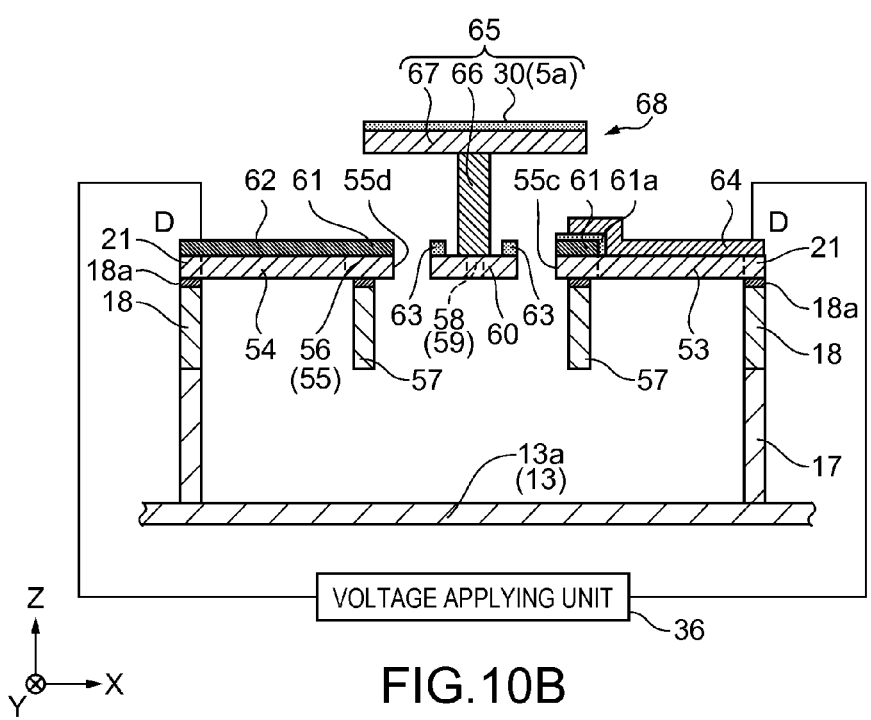

Next, one embodiment of an optical scanner will be described with reference to FIG. 10A showing a schematic plan view showing a structure of the optical scanner and FIG. 10B showing a schematic cross-sectional side view showing a structure of the optical scanner. FIG. 10B is a cross-sectional view taken along line D-D of FIG. 10A. The shape of the reflector 31 of the embodiment shown in FIGS. 4A to 5B is different from that of the first embodiment. The description of the same points as the first embodiment will be omitted.

That is, in the embodiment, as shown in FIGS. 10A and 10B, an optical scanner 51 includes a structure 52. The structure 52 is installed on the bottom plate 13a of the housing 13. The structure 52 is installed on the bottom plate 13a by laminating the first supporting frame portion 17, the second supporting frame portion 18, the oxide film 18a, and the supporting portion 21 in a square tubular shape.

A third shaft portion 53 and a fourth shaft portion 54 as a second torsion bar spring portion which extends in the X direction are installed at the center of the supporting portion 21 in the Y direction. A displacement portion 55 is installed between the third shaft portion 53 and the fourth shaft portion 54. The displacement portion 55 has a square frame shape and is a rectangle having long sides in the Y direction. A length of the displacement portion 55 in the X direction is smaller than the length of the displacement portion 24 of the first embodiment. A length of the displacement portion 55 in the Y direction is the same length as that of the displacement portion 24 of the first embodiment. The length of the displacement portion 55 in a direction along the vertical axis 12 is set as c, and the length of the displacement portion 55 in a direction along the horizontal axis 11 is set as d.

The displacement portion 55 is configured with a plate-shaped member 56 and a square tubular portion 57. A part of the displacement portion 55 positioned on the positive Y direction side of the square tubular portion 57 is set as a thin plate structure portion 55a. A part of the displacement portion 55 positioned on the negative Y direction side of the square tubular portion 57 is also set as the thin plate structure portion 55a. A part including the square tubular portion 57 and positioned inside of the square tubular portion 57 is set as a frame portion 55b. The frame portion 55b is configured with a part of the plate-shaped member 56 and the square tubular portion 57. A thickness of the thin plate structure portion 55a is thinner than a thickness of the frame portion 55b.

A first shaft portion 58 and a second shaft portion 59 as a first torsion bar spring portion which extends in the Y direction are installed at the center of the displacement portion 55 in the X direction. A movable plate 60 is installed between the first shaft portion 58 and the second shaft portion 59. The movable plate 60 has a square shape, and a size of the movable plate 60 is smaller than that of the movable plate 29 of the first embodiment. Accordingly, lengths of the plate-shaped member 56 and the displacement portion 55 in the X direction can be set to be small.

A second coil 61 is installed to surround the movable plate 60 on a surface of the displacement portion 55 facing the Z direction side. The second coil 61 is disposed in a position facing the square tubular portion 57. A second wire 62 is installed on the fourth shaft portion 54 so as to be connected to the second coil 61. The second wire 62 is installed from the second coil 61 to the supporting portion 21 through the upper portion of the fourth shaft portion 54.

A first coil 63 is installed on a surface of the movable plate 60 facing the Z direction side. The first coil 63 is disposed along the periphery of the movable plate 60. The first coil 63 and the second coil 61 are planar coils in which a conductive wire is disposed in a spiral manner. A first wire 64 is installed on the second shaft portion 59 so as to be connected to the first coil 63. The first wire 64 is disposed from the second shaft portion 59 to the supporting portion 21 through the upper portion of the second coil 61 and the third shaft portion 53. Since an insulation film 61a is disposed between the second coil 61 and the first wire 64, the second coil 61 and the first wire 64 are insulated from each other. The first coil 63 and the second coil 61 are connected to the voltage applying unit 36. By applying a voltage to the first coil 63 and the second coil 61 by the voltage applying unit 36, a magnetic field having a magnetic flux orthogonal to the horizontal axis 11 and the vertical axis 12 is generated from the first coil 63 and the second coil 61. The permanent magnet 14, the first coil 63, the second coil 61, and the voltage applying unit 36 configure a driving unit which drives the first vibration system and the second vibration system described above.

A light reflection unit 65 is installed on the movable plate 60. The light reflection unit 65 includes a support 66 and a reflection plate 67. The support 66 is installed on the movable plate 60 and the reflection plate 67 is installed on the support 66. The reflection film 30 is installed on the surface of the reflection plate 67 on the Z direction side, and the surface of the reflection plate 67 on the Z direction side is set as the reflection surface 5a. The reflection plate 67 and the displacement portion 55 are installed at an interval in the Z direction, and in a plan view seen from the Z direction side, a part of the reflection plate 67 is disposed so as to be overlapped with the displacement portion 55.

A hole positioned on the positive X direction side of the first shaft portion 58 and the second shaft portion 59 in the displacement portion 55 is set as a first hole 55c, and a hole positioned on the negative X direction side of the first shaft portion 58 and the second shaft portion 59 is set as a second hole 55d. The plate-shaped member 56 surrounding the first hole 55c and the second hole 55d is a part of the displacement portion 55. In a plan view seen from the Z direction side, the reflection plate 67 protrudes in the positive X direction with respect to the first hole 55c and protrudes in the negative X direction with respect to the second hole 55d. That is, in a plan view seen from the Z direction side, a part of the reflection plate 67 is disposed so as to be overlapped with the displacement portion 55. A diameter of the reflection plate 67 is the same as the length of one side of the movable plate 29 of the first embodiment. A reflector 68 is configured with the movable plate 60 and the light reflection unit 65.

Dimensions of each member are not particularly limited, but in the embodiment, dimensions of each portion are set to the following values, for example. A length of the structure 52 in the X direction is 6000 μm and a length thereof in the Y direction is 3000 μm. A length of the first supporting frame portion 17 in the Z direction is 1000 μm. A thickness of the supporting portion 21 is 40 μm. A length of the second supporting frame portion 18 in the Z direction is from 200 μm to 300 μm.

A length d of the displacement portion 55 in the X direction is 800 μm and a length c thereof in the Y direction is 2200 μm. A thickness of the displacement portion 55 in the Z direction is 40 μm. A length of the first hole 55c and the second hole 55d in the Y direction is 840 μm. A distance from a surface of an edge of the square tubular portion 57 on the Y direction side to a surface of an edge of the displacement portion 55 on the Y direction side is 430 μm. A length of the square tubular portion 57 in the Z direction is from 200 μm to 300 μm and a thickness thereof is from 50 μm to 100 μm. A thickness of the second wire 62 and the first wire 64 is from 5 μm to 10 μm.

The movable plate 60 is a square in which a length of one side is 300 μm, and a thickness thereof is 40 μm. The support 66 has a prismatic shape, and a length of one side in the cross section is 270 μm. A diameter of the reflection plate 67 is from 800 μm to 1000 μm.

Even when the light reflection unit 65 is installed on the displacement portion 55, the thin plate structure portion 55a functions as a damper. Accordingly, when the displacement portion 55 oscillates around the horizontal axis 11, it is possible to set the displacement portion to resist reacting with respect to the high frequency driving. As a result, it is possible to improve the vibration performance of the light reflection unit 65.

As described above, according to the embodiment, the following effects are obtained.

(1) According to the embodiment, the reflection plate 67 and the displacement portion 55 are installed at an interval in the Z direction. In a plan view seen from the Z direction side, the reflection plate 67 is overlapped with the displacement portion 55. In this configuration, a length of the displacement portion 55 can be set to be small, compared to when the reflection plate 67 and the displacement portion 55 are positioned on the same plane. Accordingly, it is possible to provide the miniaturized optical scanner 51.

Third Embodiment

Figure 11A:
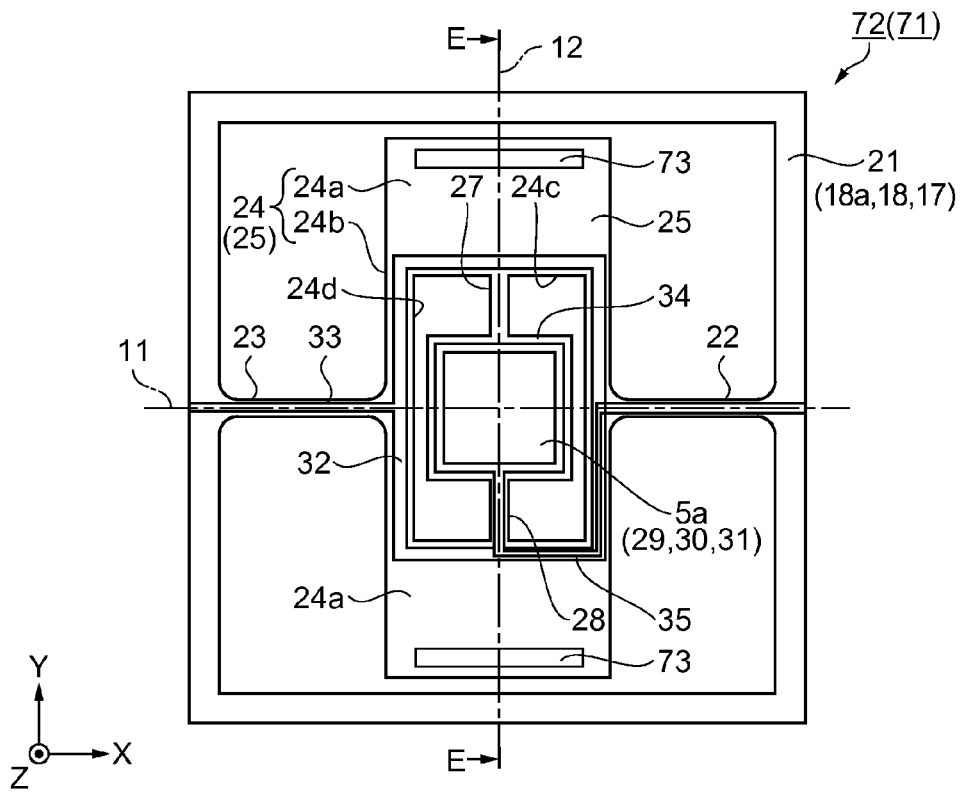
Figure 11B:
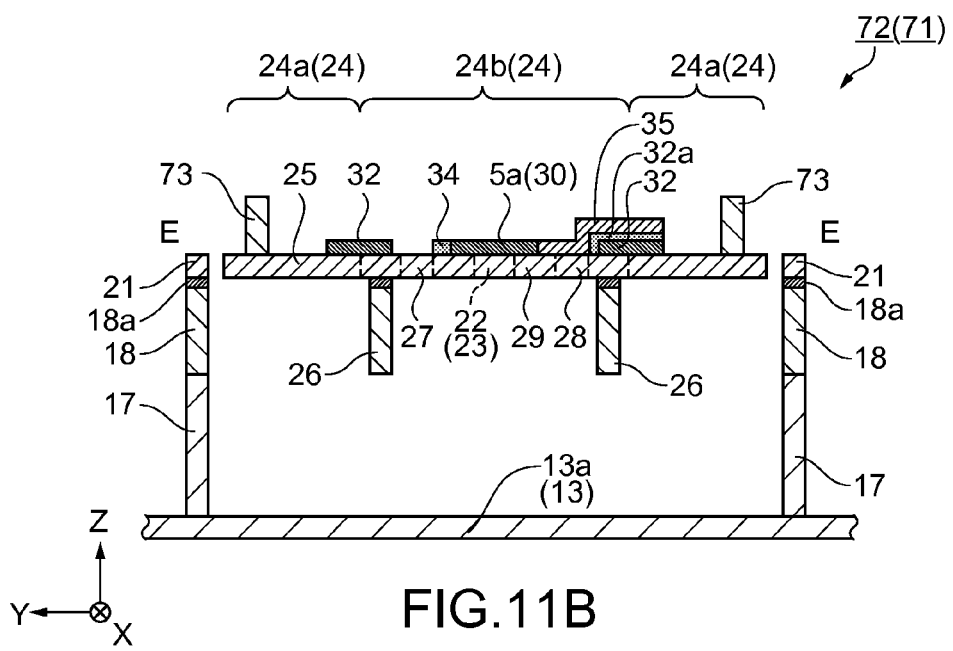

Next, one embodiment of an optical scanner will be described with reference to FIG. 11A showing a schematic plan view showing a structure of the optical scanner and FIG. 11B showing a schematic cross-sectional side view showing a structure of the optical scanner. FIG. 11B is a cross-sectional view taken along line E-E of FIG. 11A. The different point of the embodiment from the first embodiment is installation of weights on both ends of the displacement portion 24. The description of the same points as the first embodiment will be omitted.

That is, in the embodiment, as shown in FIGS. 11A and 11B, in a structure 72 of an optical scanner 71, weight portions 73 are installed on an end of the positive Y direction side and an end of the negative Y direction side of the thin plate structure portion 24a. Since the thickness of the thin plate structure portion 24a is obtained by adding a thickness of the weight portion 73 to the thickness of the plate-shaped member 25, the thickness of the thin plate structure portion 24a at the position where the weight portion 73 is installed is increased. That is, the thin plate structure portion 24a becomes thicker at the position separated from the third shaft portion 22 and the fourth shaft portion 23 than at the position close to the shaft portions.

It is possible to increase the inertia moment of the displacement portion 24 around the horizontal axis 11, compared to when the thickness of the thin plate structure portion 24a separated from the horizontal axis 11 is thin. Accordingly, it is possible to set the displacement portion 24 to resist reacting with respect to the high frequency driving. Thus, when the movable plate 29 oscillates around the horizontal axis 11, it is possible to set the movable plate to resist reacting with respect to the high frequency driving. As a result, it is possible to improve the vibration performance of the movable plate 29.

The location of the thin plate structure portion 24a where the weight portion 73 is installed is disposed on the surface opposite the side where the square tubular portion 26 is installed in the displacement portion 24. That is, the weight portion 73 is installed on the Z direction side of the displacement portion 24. The Z direction is a direction in which the frame portion 24b protrudes with respect to the thin plate structure portion 24a due to the square tubular portion 26. At that time, compared to a structure in which the side where the square tubular portion 26 is installed is the same as the side where the weight portion 73 is installed, a gravity center of the displacement portion 24 can be set to be close to the shafts of the third shaft portion 22 and the fourth shaft portion 23 as the second torsion bar spring portion. Accordingly, it is possible to reduce combined stress due to the torsion stress and bending stress applied to the second torsion bar spring portions, and to increase reliability with respect to damage to the second torsion bar spring portions.

Dimensions of the weight portion 73 are not particularly limited, but in the embodiment, the dimensions of the weight portion 73 are set to the following values, for example. A width of the weight portion 73 is from 50 μm to 100 μm and a length thereof in the Z direction is from 200 μm to 300 μm.

Fourth Embodiment

Figure 12A:
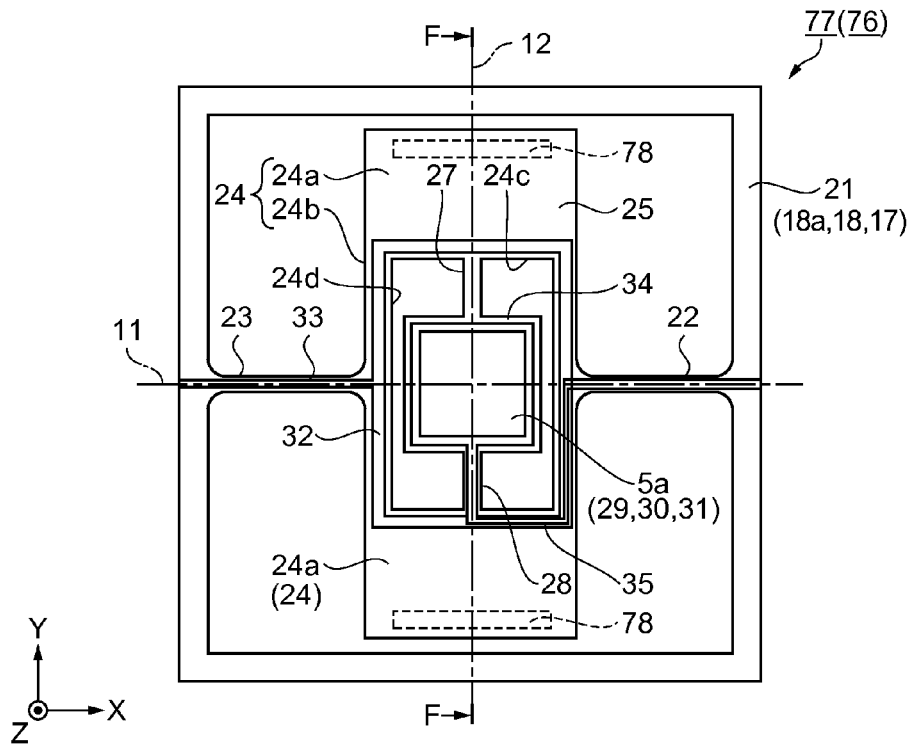
Figure 12B:
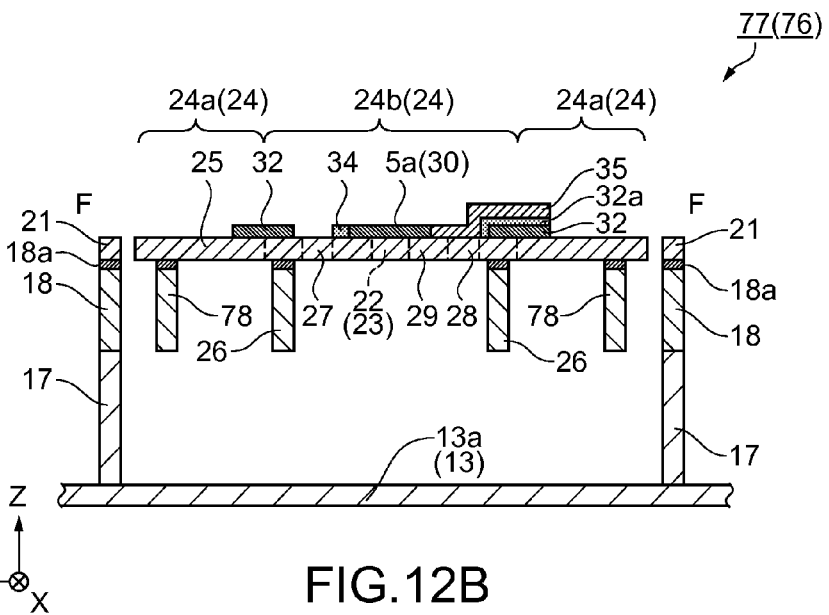

Next, one embodiment of the optical scanner will be described with reference to FIG. 12A showing a schematic plan view showing a structure of the optical scanner and FIG. 12B showing a schematic cross-sectional side view showing a structure of the optical scanner. FIG. 12B is a cross-sectional view taken along line F-F of FIG. 12A. The embodiment is different from the third embodiment in that the surface of the displacement portion 24 where the weight portion 73 is installed is different. The description of the same points as the third embodiment will be omitted.

That is, in the embodiment, as shown in FIGS. 12A and 12B, in a structure 77 of an optical scanner 76, weight portions 78 are installed on an end of the positive Y direction side and an end of the negative Y direction side of the thin plate structure portion 24a. The location of the thin plate structure portion 24a where the weight portion 78 is installed is disposed on a surface on the same side as the side where the square tubular portion 26 is installed in the displacement portion 24. That is, the weight portion 78 is installed on the negative Z direction side of the displacement portion 24. Lengths of the second supporting frame portion 18, the square tubular portion 26, and the weight portion 78 in the Z direction are the same length, and the portions thereof have the same materials.

Accordingly, the second supporting frame portion 18, the square tubular portion 26, and the weight portion 78 are formed by etching in the same step. Thus, it is possible to have a structure which is easy to manufacture the optical scanner 76.

Dimensions of the weight portion 78 are not particularly limited, but in the embodiment, the dimensions of the weight portion 78 are set to the following values, for example. A width of the weight portion 78 is from 50 μm to 100 μm and a length thereof in the Z direction is from 200 μm to 300 μm.

In this structure, it is possible to increase the inertia moment of the displacement portion 24 around the horizontal axis 11, compared to when the thickness of the thin plate structure portion 24a separated from the horizontal axis 11 is thin. Accordingly, it is possible to set the displacement portion 24 to resist reacting with respect to the high frequency driving. Thus, when the movable plate 29 oscillates around the horizontal axis 11, it is possible to set the movable plate to resist reacting with respect to the high frequency driving with. As a result, it is possible to improve the vibration performance of the movable plate 29.

Fifth Embodiment

Figure 13A:
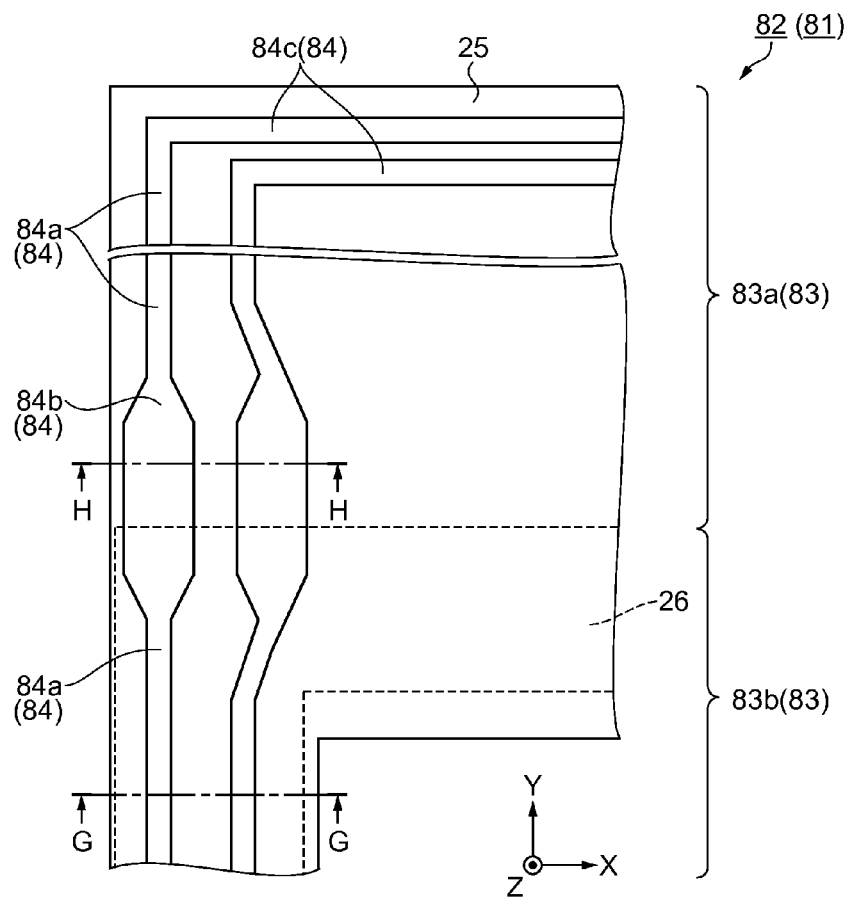
Figure 13B:
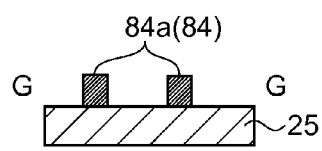
Figure 13C:
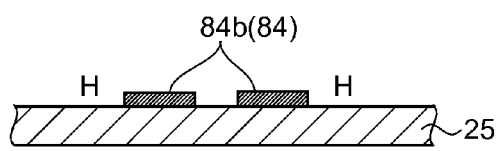

Next, one embodiment of the optical scanner will be described with reference to FIGS. 13A to 13C. FIG. 13A is a schematic plan view showing main portions of a structure of the displacement portion. FIGS. 13B and 13C are schematic cross-sectional side views showing main portions of a structure of a winding wire of the coil. FIG. 13B is a cross-sectional view taken along line G-G of FIG. 13A and FIG. 13C is a cross-sectional view taken along line H-H of FIG. 13A. The different point of the embodiment from the first embodiment is that a part of the winding wire of the second coil 32 is set to be thin. The description of the same points as the first embodiment will be omitted.

That is, in the embodiment, as shown in FIG. 13A, a structure 82 of an optical scanner 81 includes a displacement portion 83. The displacement portion 83 is configured with a thin plate structure portion 83a and a frame portion 83b. The displacement portion 83 includes the plate-shaped member 25 and the square tubular portion 26 is installed on the negative Z direction side of the plate-shaped member 25. A second coil 84 is installed on the surface of the plate-shaped member 25 on the positive Z direction side. The displacement portion 83, the thin plate structure portion 83a, the frame portion 83b, and the second coil 84 are portions respectively corresponding to the displacement portion 24, the thin plate structure portion 24a, the frame portion 24b, and the second coil 32 of the first embodiment.

The second coil 84 is formed of a second conductive wire portion 84a and a third conductive wire portion 84b. The third conductive wire portion 84b is formed to have a greater width than that of the second conductive wire portion 84a. As shown in FIGS. 13B and 13C, the third conductive wire portion 84b is formed to be thinner than the second conductive wire portion 84a. That is, the third conductive wire portion 84b is formed to have a greater width and a smaller thickness than those of the second conductive wire portion 84a. A cross-sectional area of the third conductive wire portion 84b is approximately the same cross-sectional area as that of the second conductive wire portion 84a. Accordingly, a resistance value of the third conductive wire portion 84b is approximately the same resistance value as a resistance value of the second conductive wire portion 84a.

By returning to FIG. 13A, the third conductive wire portion 84b is installed at a position where the thin plate structure portion 83a and the frame portion 83b are connected to each other. The position where the thin plate structure portion 83a and the frame portion 83b are connected to each other is a position having a difference in level with changing thickness of the displacement portion 83. When the displacement portion 83 oscillates around the third shaft portion 22 and the fourth shaft portion 23, bending stress is applied to the position where the thin plate structure portion 83a and the frame portion 83b are connected to each other. At this position, the plate-shaped member 25 is repeatedly bent in the positive Z direction and the negative Z direction, and the second coil 84 is expanded and contracted. The third conductive wire portion 84b having a small thickness is installed at a position where the thin plate structure portion 83a and the frame portion 83b are connected to each other. Accordingly, since stress decreases when the second coil 84 is bent, fatigue failure of the second coil 84 hardly occurs. As a result, it is possible to suppress disconnection of the second coil 84.

A portion of the second coil 84 which extends in the X direction in which the third shaft portion 22 and the fourth shaft portion 23 extend is set as a first conductive wire portion 84c. The first conductive wire portion 84c is positioned at a position separated from the frame portion 83b.

Bending stress is applied to the position where the thin plate structure portion 83a and the frame portion 83b are connected to each other. Since at this position, the plate-shaped member 25 is repeatedly bent in the positive Z direction and the negative Z direction, repetitive stress occurs on the displacement portion 83. Since a position where the first conductive wire portion 84c is installed is separated from a position where the thin plate structure portion 83a and the frame portion 83b are connected to each other, the position where the first conductive wire portion is installed is separated from a position where the stress fluctuates. Accordingly, it is possible to reduce stress fluctuation, compared to when the first conductive wire portion 84c is installed at a position where the thin plate structure portion 83a and the frame portion 83b are connected to each other. As a result, it is possible to suppress disconnection of the first conductive wire portion 84c due to fatigue of metals.

Sixth Embodiment

Next, one embodiment of a heads-up display using the optical scanner will be described with reference to FIG. 14. The image display device 1 of the first embodiment is used in the heads-up display of the embodiment. The description of the same points as the first embodiment will be omitted.

Figure 14:
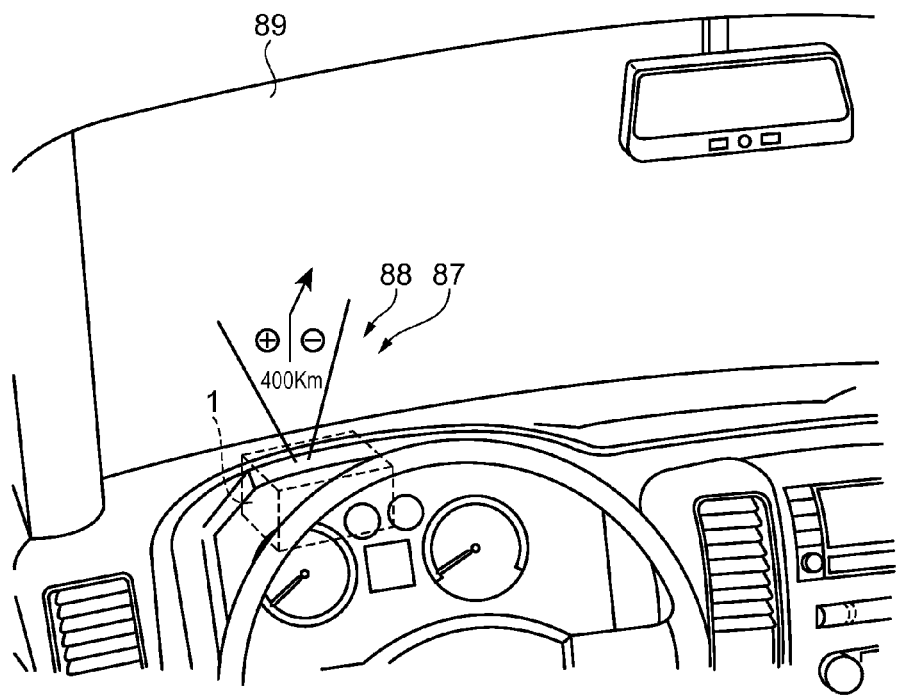
FIG. 14 is a schematic perspective view showing a heads-up display according to a sixth embodiment.

FIG. 14 is a schematic perspective view showing the heads-up display. As shown in FIG. 14, in a heads-up display system 87, the image display device 1 is mounted on a dashboard of a vehicle so as to configure a heads-up display 88. With this heads-up display 88, it is possible to display a predetermined image such as a display guiding to a destination, for example, on a windshield 89. The heads-up display system 87 is not limited to a vehicle, and can be used in an airplane or a ship, for example.

The drawing light source unit 4 and the optical scanner 5 are installed in the image display device 1. In the optical scanner 5 installed in the image display device 1, the thin plate structure portion 24a functions as a damper with the air current 43 generated around the thin plate structure portion. Accordingly, it is possible to set the oscillation of the displacement portion 24 around the horizontal axis 11 to resist reacting with respect to the high frequency driving. Thus, when the reflection surface 5a oscillates around the horizontal axis 11, it is possible to set the reflection surface to resist reacting with respect to the high frequency driving. The heads-up display system 87 can include the optical scanner 5 having excellent vibration performance and an image which is easy to see for a viewer can be displayed.

Seventh Embodiment

Next, one embodiment of a head mount display using the optical scanner will be described with reference to FIG. 15. The image display device 1 of the first embodiment is used in the head mount display of the embodiment. The description of the same points as the first embodiment will be omitted.

Figure 15:
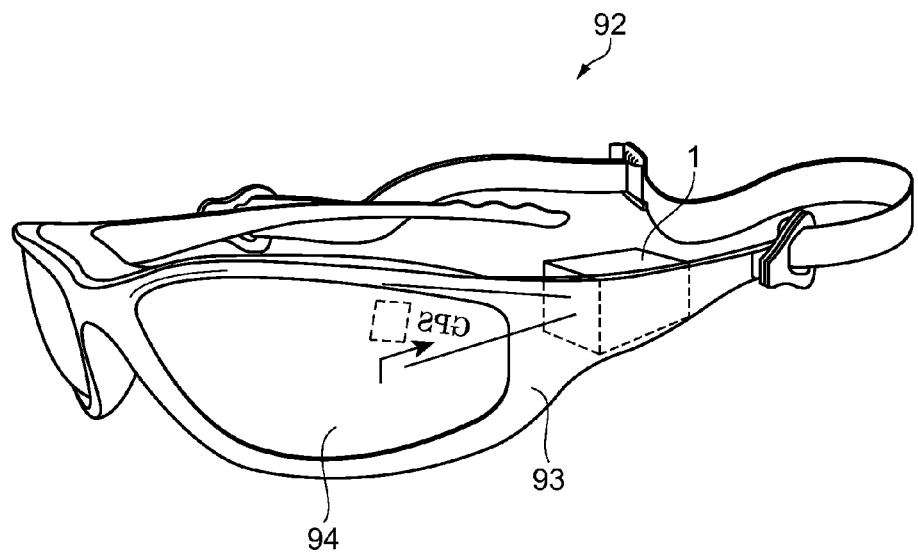
FIG. 15 is a schematic perspective view showing a head mount display according to a seventh embodiment.

FIG. 15 is a schematic perspective view showing a head mount display. As shown in FIG. 15, a head mount display 92 includes a frame 93 to be mounted on a head of a viewer, and the image display device 1 mounted on the frame 93. The drawing light source unit 4 and the optical scanner 5 are installed in the image display device 1. The image display device 1 displays a predetermined image to be recognized with one eye, on a display unit 94 provided at a portion of a lens of the frame 93. Alternatively, the drawing laser light 3 may be reflected by the display unit 94 so as to form a virtual image on a retina of a viewer.

The display unit 94 may be transparent or may be opaque. When the display unit 94 is transparent, a viewer can see the background which is seen through the display unit 94 and information from the image display device 1 in an overlapped manner. The display unit 94 may reflect at least a part of the incident light beam or a half mirror can be used as the display unit 94, for example. In addition, two image display devices 1 may be provided on the head mount display 92, and an image may be displayed on two display units so as to recognize the image with both eyes.

The drawing light source unit 4 and the optical scanner 5 are installed in the image display device 1. In the optical scanner 5 installed in the image display device 1, the thin plate structure portion 24a functions as a damper by generating the air current 43 around the thin plate structure portion. Accordingly, it is possible to set the oscillation of the displacement portion 24 around the horizontal axis 11 to resist reacting with respect to the high frequency driving. Thus, when the reflection surface 5a oscillates around the horizontal axis 11, it is possible to set the reflection surface to resist reacting with respect to the high frequency driving. The head mount display 92 can include the optical scanner 5 having excellent vibration performance and an image which is easy to see for a viewer can be displayed.

Hereinabove, the optical scanner 5, the image display device 1, the heads-up display 88, the head mount display 92, and the manufacturing method of the optical scanner 5 have been described, but the invention is not limited thereto, and configurations of the units can be substituted with arbitrary configurations having the same functions. In addition, other arbitrary configurations may be added to the invention. Modification examples are described as follows.

Modification Example 1

In the first embodiment, the movable plate 29 has a square shape in a plan view seen from the Z direction side, but a planar shape of the movable plate 29 is not limited thereto and may be a circle, an ellipse or a polygon, for example. The embodiment may be set to be easily manufactured.

In the second embodiment, the movable plate 60 and the support 66 have a square shape in a plan view seen from the Z direction side, but there is no limitation, and a planar shape of the movable plate 60 may be a circle, an ellipse or a polygon, for example. In addition, a planar shape of the reflection plate 67 has a circular shape, but there is no limitation, and may be an ellipse, a square, or a polygon, for example.

Modification Example 2

In the first embodiment, the direction in which the first shaft portion 27 and a second shaft portion 28 extend, and the direction in which the third shaft portion 22 and the fourth shaft portion 23 extend are orthogonal to each other. The direction in which the first shaft portion 27 and a second shaft portion 28 extend, and the direction in which the third shaft portion 22 and the fourth shaft portion 23 extend may intersect with each other diagonally. At that time, it is also possible to oscillate the reflection surface 5a to draw a two-dimensional image by using the drawing laser light 3.

Modification Example 3

In the third embodiment, the weight portions 73 are installed on the positive Z direction side of the displacement portion 24. In the fourth embodiment, the weight portions 78 are installed on the negative Z direction side of the displacement portion 24. The weight portions may be installed on both of the positive Z direction side and the negative Z direction side of the displacement portion 24. The position of the weight portions may be adjusted in accordance with the operation of the displacement portion 24.

In the optical scanner 51 of the second embodiment in which the light reflection unit 65 is installed, the weight portions 73 may be installed on the positive Z direction side of the displacement portion 55. In addition, in the optical scanner 51, the weight portions 78 may be installed on the negative Z direction side of the displacement portion 55. The weight portions may be installed on both of the positive Z direction side and the negative Z direction side of the displacement portion 55. The position of the weight portions may be adjusted in accordance with the operation of the displacement portion 55.

Modification Example 4

In the fifth embodiment, the second coil 84 formed of the second conductive wire portion 84a and the third conductive wire portion 84b is installed on the plate-shaped member 25. The second coil 84 can also be used in the optical scanner 51, the optical scanner 71, and the optical scanner 76, in addition to the optical scanner 81. At that time, it is also possible to suppress fatigue failure of the second coil 84.

Modification Example 5

In the sixth embodiment and the seventh embodiment, the optical scanner 5 is used in the image display device 1. Instead of the optical scanner 5, the optical scanner 51, the optical scanner 71, the optical scanner 76, or the optical scanner 81 may be used. The optical scanner of the modification examples may be used in the image display device 1. At that time, it is also possible to draw an image with excellent quality.

Modification Example 6

The light reflection unit 65 installed in the second embodiment may be used in the optical scanner 71 of the third embodiment, the optical scanner 76 of the fourth embodiment, and the optical scanner 81 of the fifth embodiment. The weight portion 73 of the third embodiment may be used in the optical scanner 76 of the fourth embodiment and the optical scanner 81 of the fifth embodiment. The weight portion 78 of the fourth embodiment may be used in the optical scanner 81 of the fifth embodiment. The characteristics of the embodiments described above may be combined with each other.

The entire disclosure of Japanese Patent Application No. 2013-223982, filed Oct. 29, 2013 is expressly incorporated by reference herein.

What is claimed is:

1. An optical scanner comprising:
a movable plate which includes a light reflection unit which reflects light;
a first torsion bar spring which oscillatably supports the movable plate around a first axis;
a displacement member which is connected to the first torsion bar spring;
a second torsion bar spring which oscillatably supports the displacement member around a second axis intersecting with the first axis;
a coil provided on the displacement member; and
a magnet which is provided spaced apart from the displacement member, and generates a magnetic field to be inclined with respect to the first axis and the second axis and to act on the coil,
wherein the displacement member defines a frame surrounding the movable plate and is oscillatably supported by the second torsion bar spring, and a damper unitary with the frame that has a smaller thickness than that of the frame and extends in a direction intersecting with a direction in which the second torsion bar spring extends from the frame;
wherein a length of the displacement member in a direction in which the first torsion bar spring extends is greater than a length of the displacement member in a direction in which the second torsion bar spring extends,
wherein the displacement member includes another damper unitary with the frame that has a smaller thickness than that of the frame and extends in the direction intersecting with the direction in which the second torsion bar spring extends from the frame, and
wherein the damper, the frame, and the another damper are disposed in this order on the displacement member in the direction intersecting with the direction in which the second torsion bar spring extends from the frame.

2. The optical scanner according to claim 1,
wherein the coil includes a first conductive wire which extends in a direction in which the second torsion bar spring extends, and the first conductive wire is positioned at a position separated from the frame.

3. The optical scanner according to claim 1,
wherein a thickness of the damper at a position separated from the second torsion bar spring is greater than a thickness of the damper at a position closer to the second torsion bar spring.

4. The optical scanner according to claim 3,
wherein a projecting portion of the damper protrudes away from the frame with respect to the damper.

5. The optical scanner according to claim 1,
wherein the light reflection unit includes a reflection plate and a support which supports the reflection plate, and
the reflection plate and the displacement member are installed at an interval in a thickness direction of the reflection plate, and the reflection plate partially overlaps with the displacement member in a plan view.

6. The optical scanner according to claim 1,
wherein the coil includes a second conductive wire and a third conductive wire, and the third conductive wire has a smaller thickness than that of the second conductive wire and a greater width than that of the second conductive wire in a plan view seen from the thickness direction of the displacement member, and
the third conductive wire is positioned at a location where the frame and the damper are connected to each other.

7. The optical scanner of claim 1, wherein the frame and the damper are formed of the same material.

8. The optical scanner of claim 1, wherein the coil includes a first conductive wire that extends in a direction in which the second torsion bar spring extends, and the first conductive wire is positioned at the damper.

9. An image display device comprising:
a light source which emits light; and
an optical scanner,
wherein the optical scanner includes:
a movable plate which includes a light reflection unit which reflects light;
a first torsion bar spring which oscillatably supports the movable plate around a first axis;
a displacement member which is connected to the first torsion bar spring;
a second torsion bar spring which oscillatably supports the displacement member around a second axis intersecting with the first axis;
a coil provided on the displacement member; and a magnet which is provided spaced apart from the displacement member, and generates a magnetic field to be inclined with respect to the first axis and the second axis and to act on the coil, and the displacement member defines a frame surrounding the movable plate and is oscillatably supported by the second torsion bar spring, and a damper unitary with the frame that has a smaller thickness than that of the frame and extends in a direction intersecting with a direction in which the second torsion bar spring extends from the frame, wherein a length of the displacement member in a direction in which the first torsion bar spring extends is greater than a length of the displacement member in a direction in which the second torsion bar spring extends, wherein the displacement member includes another damper unitary with the frame that has a smaller thickness than that of the frame and extends in the direction intersecting with the direction in which the second torsion bar spring extends from the frame, and wherein the damper, the frame, and the another damper are disposed in this order on the displacement member in the direction intersecting with the direction in which the second torsion bar spring extends from the frame.

10. The image display device according to claim 9 further comprising:
a frame to be mounted on a head of a viewer; and
wherein the optical scanner is provided on the frame so as to provide a head mount display.

11. The image display device according to claim 9 further comprising:
a dashboard of a vehicle; and
wherein the optical scanner is provided to the dashboard so as to provide a heads-up display which emits light on a windshield of the vehicle.

12. The image display device of claim 9, wherein the frame and the damper are formed of the same material.

13. The image display device of claim 9, wherein the coil includes a first conductive wire that extends in a direction in which the second torsion bar spring extends, and the first conductive wire is positioned at the damper.

\* \* \* \* \*